United States Patent [19]

Ward et al.

[11] Patent Number: 5,015,622

[45] Date of Patent: May 14, 1991

[54] MULTIDIRECTIONAL/ROTATIONAL SUPERCONDUCTOR MOTOR

[75] Inventors: Raymond C. Ward; Xingwu Wang; William B. Carlson, all of Alfred; Walter A. Schulze, Jr., Alfred Station, all of N.Y.

[73] Assignee: Alfred University, Alfred, N.Y.

[21] Appl. No.: 422,542

[22] Filed: Oct. 17, 1989

[51] Int. Cl.$^5$ .................. H92K 41/00; H92K 55/00
[52] U.S. Cl. .......................... 505/1; 310/12; 310/90.5; 505/852; 505/876
[58] Field of Search .............. 310/12, 90.5; 505/1, 505/852, 876, 877, 878

[56] References Cited

U.S. PATENT DOCUMENTS

| 4,706,007 | 11/1987 | Nagasaka | 318/687 |
| 4,797,386 | 1/1989 | Gyorgy et al. | 505/1 |
| 4,939,120 | 7/1990 | Moon et al. | 501/1 |

Primary Examiner—Steven L. Stephan
Assistant Examiner—Judson H. Jones
Attorney, Agent, or Firm—Howard J. Greenwald

[57] ABSTRACT

A contactless, multi-dimensional small stepper motor with a maximum dimension of less than about 10 centimeters is described. The motor contains at least one magnetized article, at least one superconductive primary suspending element, and at least two primary conductive elements.

Each of the primary conductive elements is separated from each adjacent primary conductive element by a distance of from about 0.01 to about 10 millimeters.

20 Claims, 16 Drawing Sheets

MULTIDIRECTIONAL/ROTATIONAL SUPERCONDUCTOR MOTOR

FIELD OF THE INVENTION

A small stepper motor containing a superconductive element for suspending a magnetized article, and means for causing two- or three-dimensional movement of the magnetized article.

BACKGROUND OF THE INVENTION

Stepper motors which cause a certain amount of motion in response to a an input electrical pulse are well known to those skilled in the art. They are disclose, for example, in P. C. Sen's "Principles of Electric Machines and Power Electronics" (John Wiley and Sons, New York, 1989). The stepper motors disclosed in the Sen book have contacts between stationary and moving parts and, thus, lose a substantial amount of energy to friction.

A superconducting stepper motor is described in an article by Andrew A. Moultrhop et al. entitled "Superconducting stepper motors," Rev. Sci. Instrum. 59 (4), April, 1988. The motor described in this paper is rotary, and it contains a several coils, each of which have many windings. This motor is not capable of moving an object in planar motion.

A linear motor with superconductive elements is disclosed in Japanese patent number 63-262056. The motor of this patent contains large stator coils, which necessitates a relatively large size for the motor and limits its usefulness in applications requiring small stepper motors.

Another linear motor with superconductive elements is disclosed in Japanese patent number 1034171. The motor of this patent also contains large coils, necessitates a large size, and limits its usefulness in applications requiring smaller size.

Superconducting tooth structures for electromagnetic devices are described in IBM Technical Disclosure Bulletin Vol. 31 No. 9 (February, 1989). The apparatus of this invention does not appear to be able to readily move an object in two- or three-dimensions within a relatively small space.

It is an object of this invention to provide a contactlass stepper motor which is substantially more efficient than most of the prior art stepper motors.

It is another object of this invention to provide a small, contactless stepper motor which has a maximum dimension of less than 10 centimeters and which is able to move a magnetized object in two- or three-dimensions within a relatively small space.

SUMMARY OF THE INVENTION

In accordance with this invention, there is provided a small, contactless, multi-dimensional stepper motor. This motor, which has a maximum dimension of less than about 10 centimeters, contains at least one superconductive element, at least two conductors, and a transportable, magnetized element.

BRIEF DESCRIPTION OF THE DRAWINGS

The present invention will be more fully understood by reference to the following detailed description thereof, when read in conjunction with the attached drawings, wherein like reference numerals refer to like elements and wherein.

DESCRIPTION OF THE PREFERRED EMBODIMENTS

Figure 1:
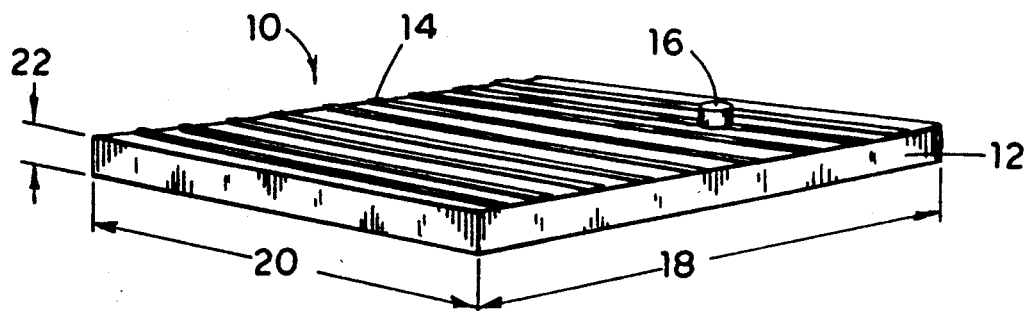
FIG. 1 is a perspective view of one preferred embodiment of the linear motor of the invention.

One preferred embodiment of the linear motor of this invention is illustrated in FIG. 1. Referring to FIG. 1, linear motor 10 is comprised of superconductive plate 12, or an assembly of superconductor elements, a multiplicity of conductors 14, and a permanent magnet 16.

The linear motor 10 is preferably a small motor, but it may have a range of sizes. In one preferred embodiment, illustrated in FIG. 1, the length 18 of said plate 12 is from about 1 millimeter to about 10 centimeters, the width 20 of said plate is from about 1 millimeter to about 10 centimeters, and the thickness 22 of the plate is from about 0.01 microns to about 1 centimeter. It is preferred that the length 18 of said plate 12 be from about 1 millimeter to about 4 centimeters, the width 20 of said plate be from about 1 millimeter to about 4 centimeters, and the thickness 22 of the plate be from about 1 micron to about 4 millimeters. In an even more preferred embodiment, length 18 is from about 2 to about 3 centimeters, width 20 is from about 2 to about 3 centimeters, and thickness 22 is from about 1 to about 3 millimeters. A motor of proportionally larger or smaller dimensions also is feasible; this motor may comprise a similar assembly of elements.

Plate 12 may be of any shape such as, e.g., square, rectangular, circular, elliptical, irregular, and the like. In one embodiment, it is preferred that plate 12 be substantially square.

Plate 12 preferably consists essentially of superconductive material. As is known to those skilled in the art, superconductivity is that phenomenon in which certain metals, alloys, compositions, and compounds at relatively low temperatures lose both electrical resistance and magnetic permeability, i.e., have inifinite electrical conductivity. See, e.g., N. I. Sax et al.'s "Hawley's Condensed Chemical Dictionary," Eleventh Edition (Van Nostrand Reinhold Company, New York, 1987), into this specification.

The critical temperature of a superconductor is that temperature at which superconductivity occurs. It is preferred, in the devices of this invention, that superconductive material with a critical temperature no lower than about 77 degrees Kelvin (the boiling point of liquid nitrogen) be used. In one embodiment, the superconductive material has a critical temperature greater than about 85 degrees Kelvin. It will be apparent to those skilled in the art that these devices will work at temperatures lower than 77 degrees Kelvin.

One class of superconductors which may be used are "Type II" superconductors with a critical temperature greater than about 77 degrees Kelvin. As is known to those skilled in the art, Type II superconductors are characterized by first and second values of critical field, $H_{c,1}$ and $H_{c,2}$—in which field penetration first occurs at the lowest value to result in pinned fields which persist to much higher $H_{c,2}$ levels. See, e.g., U.S. Pat. No. 4,797,386 of Gygorgy et al the disclosure of which is hereby incorporated by reference into this specification, and M. Tinkham, "Introduction to Superconductivity," Chapter 5, page 143 (McGraw-Hill, Inc., 1975).

The critical current of the superconductive material is an important parameter. As is known to those in the art, the critical current is the threshold current flowing through the superconducting material beyond which superconductivity begins to deteriorate. See, e.g., the aforementioned Tinkham book.

In an especially preferred embodiment, the superconductor material 12 has a critical temperature of at least about 77 degrees Kelvin, is a Type II material, and is a ceramic material.

In one preferred embodiment, the superconductor material used in the invention has specified $H_{c,1}$ and $H_{c,2}$ properties. The $H_{c,1}$ of these preferred materials is from about 10 to about 100 Gauss. The $H_{c,2}$ of these materials is from about 30 to about 100 Tesla. The second value of the critical field of the superconductor material is generally at least about 10,000 times as great as the first value of the critical field of the material.

High-temperature superconductors which may be used in the invention are described in an article by A. W. Sleight entitled "Chemistry of High-Temperature Superconductors," Science, Volume 242 (Dec. 16, 1988) at pages 1519-1527.

One preferred class of superconductors, described on pages 1522-1523 of the Sleight article, is of the formula $RBa_2Cu_3O_{6+x}$, wherein x is from about 0.5 to about 1.0 and R is a rare earth element selected from the group consisting of yttrium, gadolinium, lanthanum, europium, holmium, and the like. In one preferred embodiment, R is yttrium.

Another preferred class of superconducting materials is of the formula $(AO)_m M_2 Ca_{n-1} Cu_n O_{2n+2}$, wherein A is selected from the group consisting of thallium, bismuth, and mixtures of bismuth and lead, m is from about 1 to about 2 (and generally is 1 or 2 when A is thallium and is 2 when A is bismuth), M is selected from the group consisting of barium and strontium, and n is at least 1. In one preferred embodiment, illustrated on page 1523 of the Sleight article, A is thallium, m is 2, M is barium, and n is 3; this composition has a critical temperature of about 122 degrees Kelvin.

The superconductor used in this invention, when tested in accordance with a specified test, will have a specified levitation height. As is known to those skilled in the art, superconducting materials exhibit the "Meissner effect," which is the exclusion of a magnetic field from a superconductor. See, e.g., M. Tinkham's "Introduction to Superconductivity," supra.

As is known to those skilled in the art, levitation height may be calculated from the following Hellman equation:

$$d = (MH_{c,1}L/P\,D\,g)^{\frac{1}{2}},$$

wherein d is the levitation height, as measured from the center of the levitating object to the top surface of the superconductor, in centimeters; M is the magnetic moment of the levitating object, in gauss; $H_{c,1}$ is the first critical field value, as discussed hereinabove; L is the thickness of the superconducting material, P is pi, and is equal to about 3,1416, D is the density of the levitating object, and g is the gravitational constant, and is equal to about 9.81 meters per second per second. Reference may be had to an article by F. Hellman et al. entitled "Leviatation of a magnet over a flat type II superconductor" (Journal of Applied Physics, 63 (2), Jan. 15, 1988). The levitation height may be expressed as a function of the first critical field; it may also be expressed as a function of the critical current. See, for example, the aforementioned Tinkham's book and L. C. Davis et al., "Stability of magnets levitated above superconductors," Journal of Applied Physics, 64(8), 15 Oct., 1988.

In the levitation height test used, which determines the levitation height obtained by a specified magnet with the superconductor material to be tested, one uses a specified rare earth cobalt magnet (obtained from the Edmund Scientific Company, 1989 catalog number D33,168, page 148) which had a magnetic moment of 8,200 gauss, a mass of 0.24 grams, a diameter of 0.476 centimeters, and a thickness of 0.159 centimeters. In this test, the superconducting material is formed into a flat, substantially square shape with a thickness of about 0.3 centimeter and a width of about 3 centimeters. The superconducting material used in this test is a bulk material obtained by a solid state reaction method, and the critical current of it is around 100 to 1,000 amperes per square centimeter. If different processing techniques are used (such as thin film formed by evaporation), then the critical current will be different. In one embodiment, where the thin film is formed by electron beam evaporation, the critical current will be from 10,000 to about 100,000 amperes per square centimeter. With such a film, with a thickness of about 1 micron, levitation of the specified permanent magnet also can be achieved.

The levitation height obtained with the superconductor flat square which is tested in accordance with this procedure is preferably at least about 0.7 centimeters.

If the procedure is changed to vary, e.g., the thickness of the superconducting square, the density of the levitating object, or other parameters described in the aforementioned formula, different levitation heights will result with the same superconductive material. The levitation height obtained with the superconductor material in the form of the specified flat square is determined in accordance with the aforementioned test. In general, in applicants' system, the levitation height of the system must be at least about 0.1 centimeters.

The stability of magnets levitated above superconductors depends upon several factors such as the flux penetration and the pinning effects. See, e.g., an article by L. C. Davis et al. entitled "Stability of magnets levitated above superconductors," supra.

The pinning force exerted by the magnetized object upon the superconductive plate may be estimated by the following formula of Davis:

$$F_D = 5L \cdot U_O (H_{max})^3 / 24 J_c,$$

wherein $F_D$ is the pinning force (in Newtons), L is the levitation height of the system (in meters), $U_O$ is the magnetic permeability of free space (in tesla-meters/ampere), $H_{max}$ is the maximum magnetic field (in amperes/meter), and $J_c$ is the critical current of the superconductor material (in amperes/square meter). Reference may be had to L. C. Davis et al.'s "Stability of magnets levitated above superconductors," page 4212, supra.

The pinning effect is important with the devices of this invention, for it helps insure stable levitation of the magnetized article. Other factors also affect such stability, such as the strength of the magnetic field around the magnetized article, and/or electromagnetic field around the conductors, the mass distribution of the magnetized article, the magnetic moment (which varies with the geometry of the magnet) of the magnetized article. It is noted that some residual flux lines may be remained after the magnetic field is presented near the type II superconductors. Such residual fluxes can be removed by applying exponentially decaying-alternating current through the conductors. This technique is known as the "demagnetization". The flux lines can also be removed by increasing the temperature of the superconductor beyond its critical temperature, and then cooling it down below the critical temperature without the presence of the magnetic field.

In one preferred embodiment, the superconductor used in the invention is of the formula $YBa_2Cu_3O_{7-x}$, the well known 1-2-3 superconducting phase. This superconducting material is prepared by a solid state reaction method. Stoichiometric amounts of yttrium oxide, barium carbonate, and copper oxide are intimately mixed and ground, and the powder is then calcined in a special calcination cycle.

In the preferred calcination cycle used by applicants, the material is first raised from ambient temperature to a temperature of from about 900 to about 960 degrees centigrade at a rate of from about 100 to about 400 degrees centigrade per hour. It is preferred to raise the temperature of the material from ambient temperature to a temperature of from about 910 to about 930 degrees centigrade at a rate of from about 275 to about 325 degrees centigrade per hour. In one preferred embodiment, the temperature of the material is raised to from about 920 to about 930 degrees centigrade at a rate of about 290 to about 310 degrees centigrade per hour. Once the material reaches the temperature of from 900 to 960 degrees centigrade, it is maintained at this temperature for from about 10 to about 15 hours. Thereafter, its temperature is reduced to ambient at a rate of about from about 100 to about 400 degrees per hour. In one preferred embodiment the sample is held for 12 hours at 925 degrees centigrade.

The cooled calcined material is then ground until substantially all of its particles are smaller than 44 microns (standard US mesh size 325), and then the entire calcination/grinding cycle may be repeated one or more times.

It will be apparent to those skilled in the art that other calcination/grinding cycles which improve the homogeneity of the powder batch also may be used.

Without wishing to be bound to any particular theory, applicants believe that the use of the grinding/calcination cycle produces a superconductor with a pure phase. Shaped objects made from material thus processed are less brittle, or substantially more suitable.

Any conventional means may be used to prepare the shaped objects. Thus, for example, one may use the forming processes described in James S. Reed's "Introduction to the Principles of Ceramic Processing," (John Wiley and Sons, Inc., New York, 1988).

In one preferred embodiment, the calcined powder is formed into a shaped object by pressing. The pressing techniques described at pages 329–355 of said Reed book may be used. In general, in this embodiment, it is preferred to use a pressing pressure of from about 6 thousand to about 12 thousand pounds per square inch. In a more preferred embodiment, the pressure used is from about 7,000 to about 9,000 pounds per square inch. In general, this pressure is applied to the powder for from at least about 1 minute and, preferably, from about 1 to about 3 minutes. With the 1-2-3 calcined powder described above, a pressing time of from about 1 to about 2 minutes, a pressure of about 8,000 p.s.i., and a press and release sequence of about 3 times, is suitable.

The pressed body is then preferably sintered under specified conditions to yield a sintered body with substantially no internal deformations. Sintered bodies will have the suitable flux pinning characteristics and desired mechanical strengths. A unique sintering cycle is utilized for this purpose. During this entire sintering and annealing cycle, the pressed body is maintained under a flowing oxygen-containing gas while being sintered. The oxygen containing gas may be pure oxygen. The oxygen-containing gas preferably is at a pressure of at least about 1 atmosphere, and it is flowed over the pressed plate(s) at a rate of from about 1 to about 100 cubic centimeters per minute.

It is preferred to raise the temperature of the formed body from ambient to a temperature of from about 930 to about 970 degrees centigrade at a rate of less than about 300 degrees centigrade per hour while the pressed body is under a flowing, oxygen-containing gas. It is more preferred to raise the temperature of the body from ambient to a temperature of from about 940 to about 960 degrees centigrade at a rate of less than about 250 degrees centigrade per hour.

Once the pressed body has reached the sintering temperature, it is maintained at this temperature under flowing oxygen-containing gas for at least about 12 hours. It is preferred to maintain the body at this temperature for from about 22 to about 26 hours. In one embodiment, the pressed body is maintained under these conditions for about 24 hours.

After the pressed body has been sintered under the aforementioned conditions, it is then cooled to a temperature of from about 450 to about 650 degrees centigrade at a rate of less than about 150 degrees centigrade per hour while under said flowing oxygen-containing gas. In one preferred embodiment, the sintered body is cooled to a temperature of from about 450 to about 550 degrees centigrade at a rate of from about 90 to about 110 degrees centigrade per hour.

After the sintered body has been cooled to a temperature of from about 450 to about 550 degrees centigrade, it is annealed at this temperature while under said flowing oxygen-containing gas for at least about 5 hours and, preferably, from about 5.5 to about 6.5 hours.

In the embodiment involving the 1-2-3 superconducting phase of yttrium/barium/copper, described above, the superconducting orthorhombic phase is formed during this annealing process. After the material has been annealed, it is then cooled to ambient temperature; it is preferred, though not essential, that this cooling step occur under flowing oxygen-containing gas. The cooling to ambient temperature occurs at a rate of less than about 100 degrees centigrade per hour. In one preferred embodiment, the cooling rate is about 60 degrees centigrade per hour.

Referring again to FIG. 1, conductors 14 conduct electric current and, in such process, generate electromagnetic fields around them in accordance with Ampere's Law. See, e.g., pages 350–365 of Robert L. Weber et al.'s "College Physics," Third Edition (McGraw-Hill Book Company, New York, 1959).

Conducting means 14 may be any conducting material. Thus, by way of illustration and not limitation, conducting means 14 may consist essentially of copper, aluminum, silver, gold, and/or another superconductor. The conducting means can be of substantially any shape. Thus, it may be in the form of a wire or strip which has a circular, square, rectangular, or irregular cross-section.

In one preferred embodiment, copper or silver wire is used. In this embodiment, it is preferred that the gauge of the wire be from about 20 to about 40. As is known to those skilled in the art, the gauge of a wire conductor is specified as "American Wire Gauge Conductor Series"; and an AWG number of 30, e.g., refers to 30 gauge wire. A table describing the AWG conductor series appears, e.g., on page 766 of Herbert W. Jackson's "Introduction to Electric Circuits," Sixth Edition (Prentice Hall, Englewood Cliffs, N.J., 1986).

In one embodiment, one may use a wire conventionally referred to as "magnet wire" with a gauge of from about 20 to about 40; see, e.g., page 793 of catalog 110 Newark Electronics, Chicago, Il.

Conducting means 14 may be attached to plate 12 by any conventional means. It is essential, however, that an insulating barrier shield conducting means 14 from plate 12.

In one embodiment, conducting means 14, in the form of wire, is glued to the surface of plate 12. In another embodiment, conducting means 14 is inserted into grooves cut into the surface of plate 12. In yet another embodiment, conducting means 14 is deposited by means of thermal vapor deposition, sputtering, electron beam vapor deposition, flame or plasma spray, thick film printing, etc. upon plate 12. See, e.g., P. Moran's "Hybrid Microelectronic Technology," Electrocomponent science monograms, vol. 4 (Gordon and Breach Science Publishers, New York, 1984). Means of connecting conducting means 14 to plate 12 will be discussed later in this specification.

The separation between adjacent conducting means 14 should be relatively small. It is preferred that the distance between adjacent conducting means 14 be no greater than about 1 centimeter.

The conducting means 14 generally will have a largest cross-sectional dimension which does not exceed about 5 millimeter. The largest cross-sectional dimension is the longest line which may be drawn from any point on the periphery of the cross-section to any other point on the periphery. In the case of a circle, e.g., it will be the diameter.

It is preferred that the largest dimension of the cross-sectional area of conducting means 14 be no greater than about 3 millimeters. In one embodiment, such largest dimension is no greater than about 1 millimeter.

Figure 2:
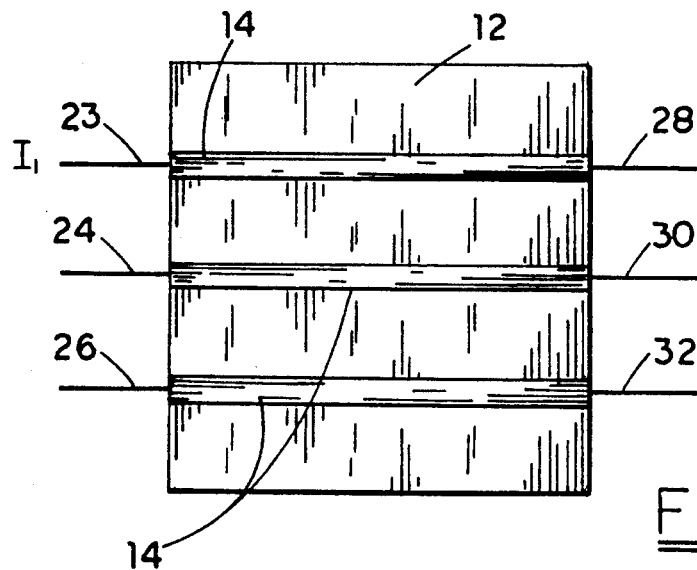
FIG. 2 is a top view of the embodiment of FIG. 1.

Linear motor 10 comprises a means for generating an electromagnetic field. These means include, in addition to conducting means 14, the connecting leads from a current source. Thus, referring to FIG. 2, which is a top view of the linear motor of FIG. 1, leads 22, 24, and 26 conduct current into wires 14, and leads 28, 30, and 32 conduct current away from conductors 14.

Leads 22 and 28 may be connected to conductor 14 by any conventional means known to those skilled in the art. Thus, the leads may be conducted to the conductor 14 by soldering, by mechanical means (such as clips), and the like.

In one embodiment, not shown, one or more of the leads is an integral part and extension of conductor 14.

Figure 3:
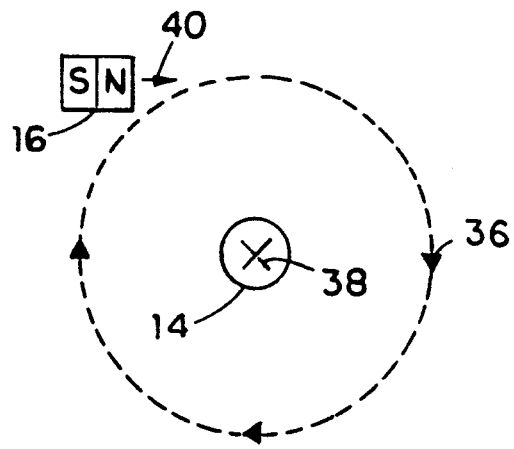
FIG. 3 illustrates the electromagnetic fields caused by current flowing through a conductor and the motion such fields cause in a magnetized object.

Referring again to FIG. 1, linear motion of magnet 16 is caused by electromagentic fields around one or more of conductors 14. Some of the forces causing said motion are illustrated in FIG. 3. By controlling the magnitude, direction, and timing of said fields, magnet 16 may be caused to move in a forward and/or backwards direction.

It is apparent to those skilled in the art that there are several factors affecting the performance of the motors, such as the geometry, mass distribution, and the strength of the magnetic moment of the magnetized article. In one preferred embodiment, such magnetized object can be formed according to some engineering designs. For example, one may cut a disc-shaped magnet into two half-moon shaped magnets. Due to gravity force, the curved edge side will be facing downwards. When the north and south poles are aligned perpendicularly to the flat surfaces, the magnet will be in a stable configuration.

In another application of the devices the magnetized article(s) may have random shape(s), where the devices can be used as filters.

FIG. 3 illustrates the electromagnetic field produced by passing a current through a wire. Referring to FIG. 3, when current flows in direction 38 into the plane of the paper, then the electromagnetic field shown with field direction 36 is produced. When magnet 16 is disposed above and to the left of wire conductor 14, it will be forced to the right, as indicated by arrow 40.

Figure 4:
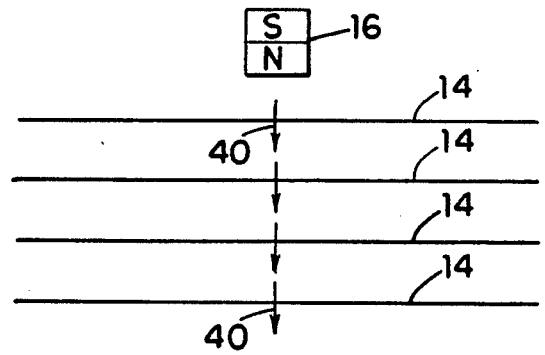
FIG. 4 illustrates the stepwise motion of a magnetized object which may be created in the embodiment of FIG. 1.

FIG. 4 is a top view of the linear motor of FIG. 1 from which details of superconducting plate 12 have been omitted for the sake of simplicity. When the current flows in the direction indicated as 34 in FIG. 3, then a magnet 16 will be moved across conductors 14 stepwise in direction 40. In this embodiment, it is preferred to apply pulsed current first to the conductor 14 nearest magnet 16, and then to the next nearest one, and then to the next nearest one, etc. The magnet 16 is thus moved stepwise across the conductors 14 as they each, in their turn, attracts it.

It is also possible to create a repulsive force rather than an attractive force to achieve the desired motion. In addition, a combination of the attractive and repulsive forces can be utilized. The attractive and/or repulsive forces can be produced from a pulsed DC current, an alternating current, or the combination of both.

Figure 5:
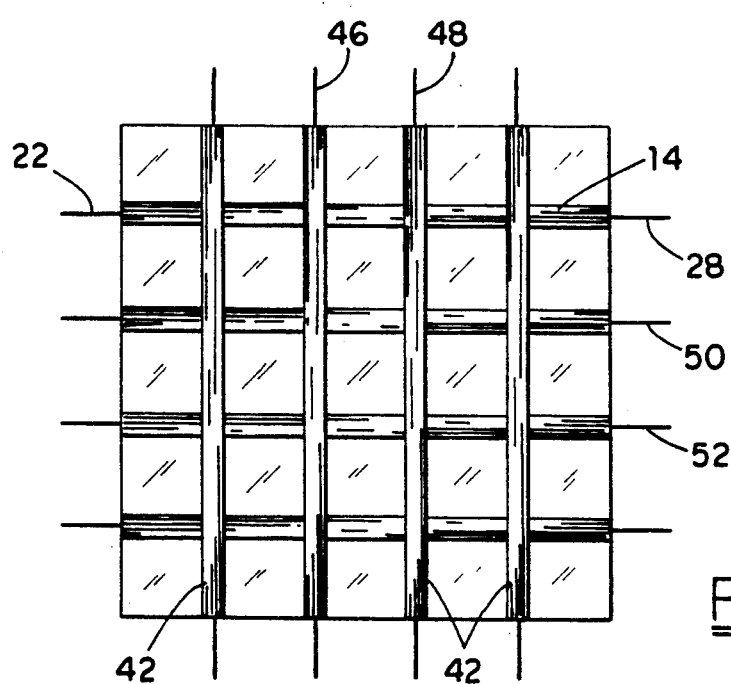
FIG. 5 is a top view of a preferred embodiment of the motor of this invention in which two-dimensional motion is obtainable.

FIG. 5 illustrates another embodiment of the invention, a planar motor. In this embodiment, the conductors are dispoosed above superconductive plate 12 in a grid pattern.

Referring to FIG. 5, conductive strips 14 are arranged substantially horizontally across the top of superconductive plate 12. Each of these strips 14 may be connected to suitable leads, such as leads 22, 28, 50, and 52.

Conductive strips 42 are arranged substantially perpendicularly to strips 14 and also may be connected to suitable leads, such as leads 46 and 48.

Conductive strips 42 are insulated from conductive strips 14, which in turn are insulated from the top surface of superconductive plate 12.

In the embodiment of FIG. 5, conductors 14 and 42 have dimensions similar to those specified for the conductors of the linear motor of FIG. 1. Each of conductors 14 and 42 may have substantially the same dimensions; or they may be different. The spacing between a set of horizontal conductors 14, and the spacing between a set of vertical conductors 42, is substantially similar to the spacing of the horizontal conductors 14 of the linear motor of FIG. 1.

Figure 6:
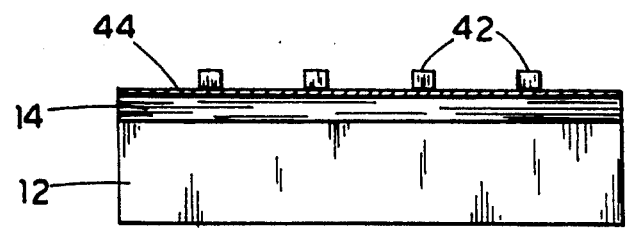
FIG. 6 is a cross-sectional view of the embodiment of FIG. 1.

One embodiment of the insulating barrier which exists between conductors 14 and 42 is illustrated in FIG. 6. Referring to FIG. 6, insulating barrier 44 is disposed between conductors 14 and 42. Another insulating barrier, not shown, is disposed between the top surface of superconductive plate 12 and conductors 14.

Figure 5A:
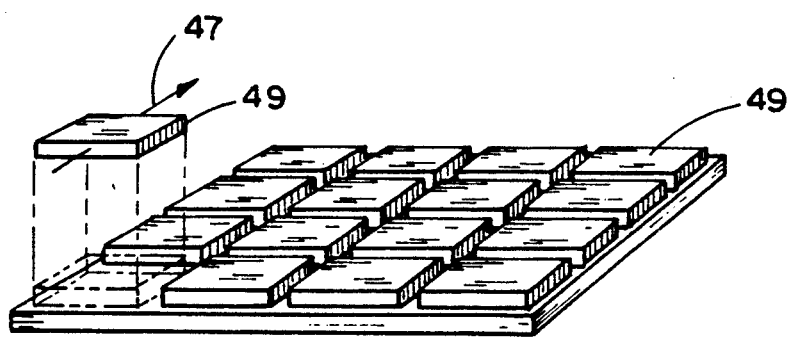
FIG. 5A is a perspective view of another preferred embodiment of the motor of this invention in which two-dimensional motion is obtainable and in which, for the sake of illustration, one of the superconductive elements is shown in broken-away detail.

In another embodiment of the invention, shown in FIG. 5A, superconductive plate 12 is comprised of a multiplicity of substantially square superconductive sections 49 which are separated from each other by electrical insulation. The motor of this embodiment may be substantially larger than the linear motor of FIG. 1. (An alternative design of FIG. 5A is to use superconducting wires rather than superconductive cells.) By applying current 47 to one of said insulated squares 49, the superconductivity of that square 49 will be substantially reduced and/or destroyed as long as the current is larger than the critical current of the superconductive cell. Current can be applied to different isolated squares at different times to cause the Meissner effects of such square to vary. A magnet levitating above said insulated square will no longer be repelled once the superconductivity of a particular square is destroyed. The magnet, thus, can be caused to hop from the top of one cell whose superconductivity has been destroyed to another by selectively applying current to said cells; and it can be caused to move in a one and/or two dimensional pattern. By using the similar means of control, additional degrees of freedom of motion are also possible. For example, motion along the vertical direction normal to the base plate 14 may be obtained.

Figure 5B:
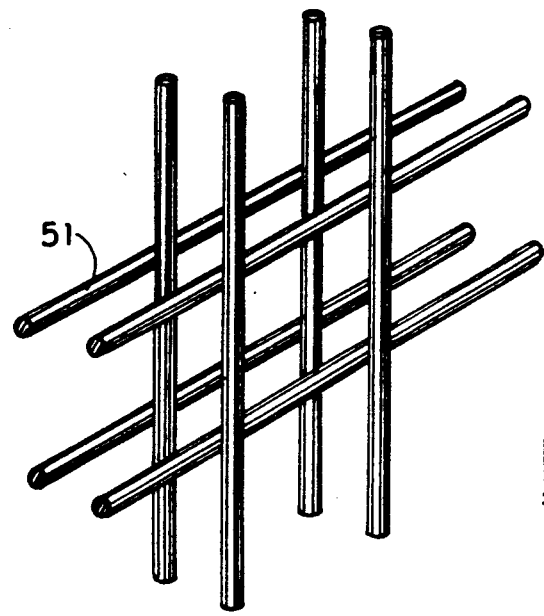
FIG. 5B is a partial perspective view of another preferred embodiment of the motor of this invention in which three-dimensional motion is obtainable.

Referring to FIG. 5B, which is partial perspective view of a three-dimensional motor of this invention, rods 51 consist of superconductive material described above. The rods may be coated with one or more strips of conductors (not shown) by means such as pasting, evaporating, inserting, or otherwise attaching the conductors to the superconducting rods. A magnetized object, not shown, can move in a three-dimensional pattern within the space defined by the rods in response to current pulses delivered to selected portions of the rods by the conductive wires.

Figure 5C:
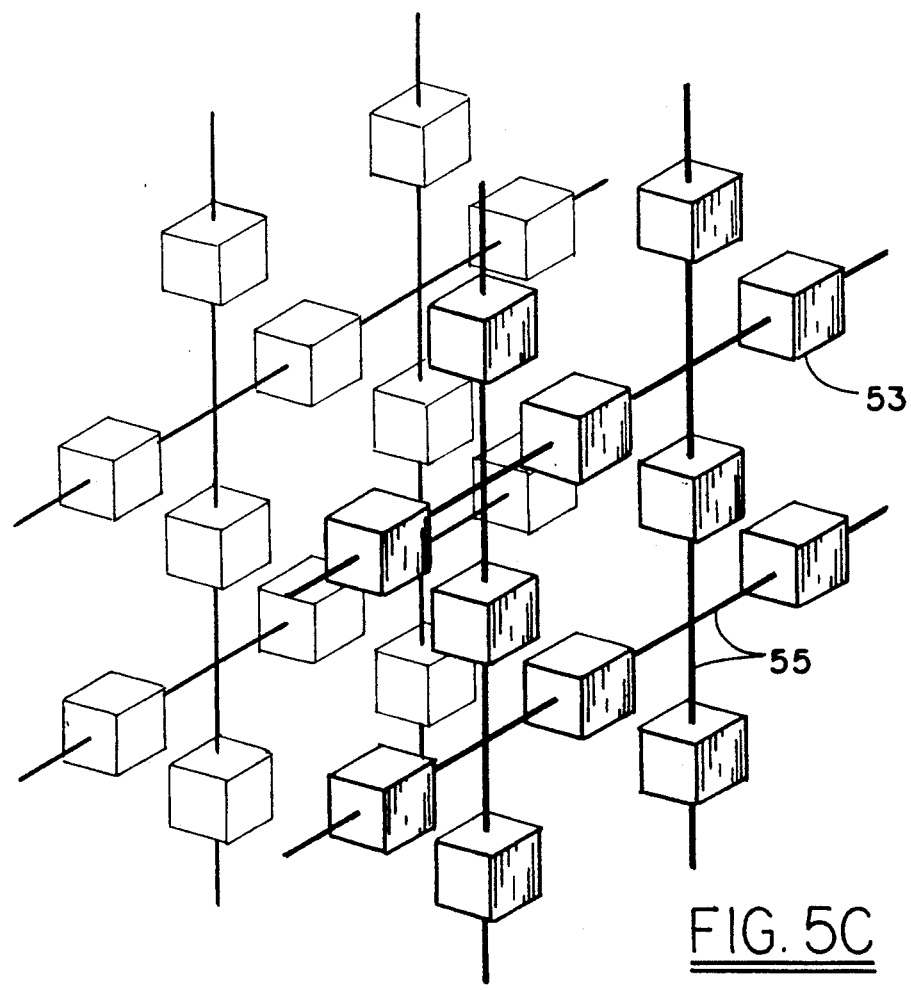
FIG. 5C is another partial perspective view of yet another preferred embodiment of the motor of this invention in which three-dimensional motion is obtainable.

Another three-dimensional motor embodiment is illustrated in FIG. 5C. In this embodiment, superconductive blocks 53 are supported by frame members 55. Conductors, not shown, are attached to the frame members 55. A magnetized object, not shown, within the space defined by the frame can be moved in any direction or combination of directions by passing current pulses to the selected portions of the frame at appropriate times.

Figure 5D:
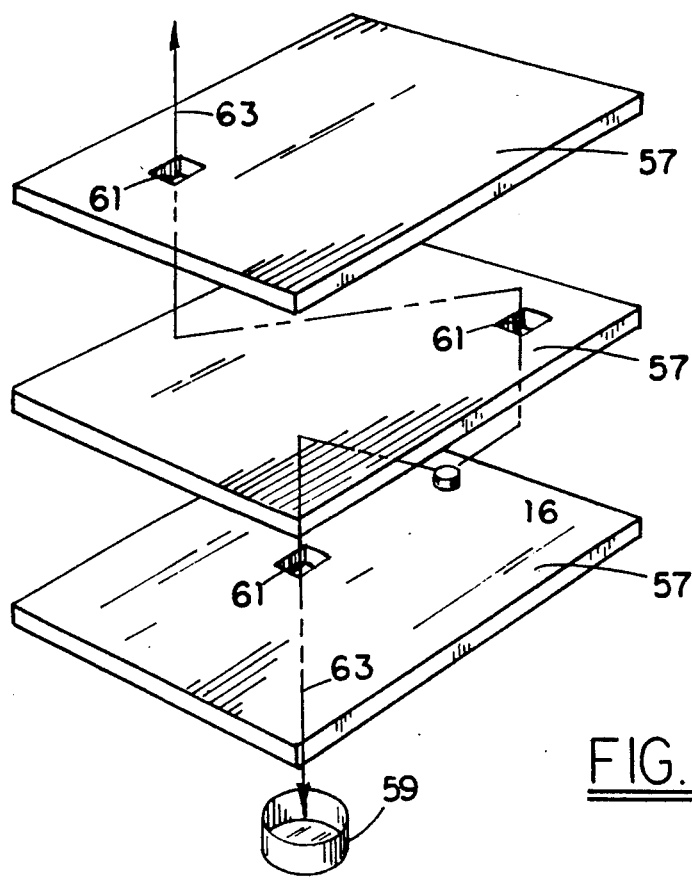
FIG. 5D is a perspective view of yet another preferred embodiment of the motor of this invention in which a combination of planar and vertical motion is obtainable.

Yet another three-dimensional motor embodiment is illustrated in FIG. 5D. In this embodiment, plates 57 consist essentially of the aforementioned superconductive material. Conductors, not shown, are attached to these plates (see, e.g., FIG. 5). Each of plates 57 is comprised of at least one orifice 61. The magnetized object 16 may be moved above each plate 57, and/or through orifice 61 of each plate along directions 63. This device can be used as a filter, in which case some selected particles will be deposited into or taken away from container 59.

Figure 5E:
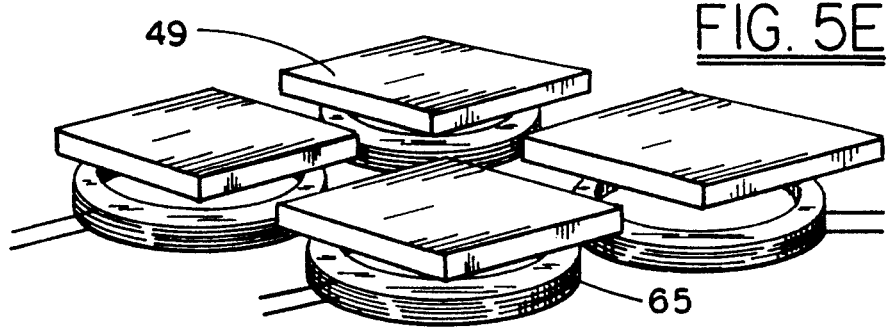
FIG. 5E is a perspective view of yet another preferred embodiment of the motor of this invention in which two-dimensional motion is obtainable and which operates by a principle different than the motor of FIG. 1.

In yet another embodiment, shown in FIG. 5E, one electromagnetic coil 65 is placed under each of a series of electromagnetically isolated superconductive cells 49 which are in a matrix format. The motor of this embodiment may be substantially larger than the linear motor of FIG. 1. By passing current through a selected one of the coils, a magnetic field will be produced around that coil. When the field is larger than the first critical field of superconductor, $H_{c, 1}$, the superconductivity of the corresponding cell will be reduced or destroyed. The magnet above the cell whose superconductivity has been reduced or destroyed will tend to be attracted by the force of gravity towards the surface of such cell. If an electromagnetic field is applied to one or more adjacent cells, and the current to the first cell is stopped, then the magnet will be moved to the next selected cell in a hopscotch manner.

Referring again to FIG. 6, insulating barrier 44 is disposed between conductor 14 and conductor 42. Any suitable insulating material may be used to form the insulating barrier. Thus, for example, barrier 44 may be an organic (such as epoxies) or an inorganic (such as glasses and crystalline materials).

The insulating layers can form either around conductors 14 and/or 42, or just in the areas needed to insulate them from each other and the superconductor plate 12. Other means can also be used to form insulating barrier 44, such as the processes used to construct the conducting means 14 described hereinabove.

In one preferred embodiment, the insulating material is an epoxy resin. As is known to those skilled in the art, epoxy resins have in their molecules a highly reactive oxirane ring. See, e.g., pages 287-289 of George S. Brady et al.'s "Materials Handbook", Twelfth Edition, (McGraw-Hill, New York, 1986). One preferred epoxy resin adhesive useful for insulating and joining conductors 14, 42 and superconductor 12 is "1266 Epoxy A and B" which is manufactured by the Emerson and Cuming Company of Massachusetts and is sold by Dean Co. of Ithaca, N.Y. Other means of insulating conductors 14 and/or 42 will be discussed later in this specification with relation to FIGS. 25, 26, and 27.

Figure 7:
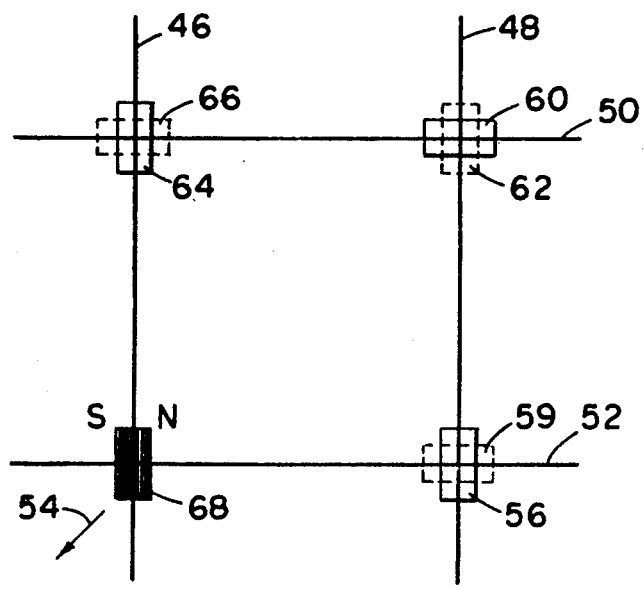
FIG. 7 illustrates the planar motion obtainable with a magnetized object with the motor of FIG. 5.

FIG. 7 illustrates some of the ways in which a magnet may be moved across the planar motor of FIG. 5. Referring to FIG. 5, current may be introduced into horizontal conductors 14 (via leads 22, 28, 50, and 52) and vertical conductors 42 (via leads 46 and 48). Referring to FIG. 7, the magnet may be placed in position 54 substantially perpendicular to lead 52 and parallel to lead 46. When current is passed through lead 48, then the magnet moves from position 54 to position 56, being attracted by the electromagnetic field around conductor 42 (see FIG. 5). When the magnet reaches position 56, the current through lead 48 may be turned off.

When the magnet is in position 56, it may be rotated 90 degrees to position 59 by applying current through lead 52. Thereafter, the magnet may be moved to position 60 by applying current through lead 50. Again, once the magnet reaches position 60, the current through lead 50 should be turned off.

In a similar manner, the magnet may be rotated 90 degrees from position 60 to position 62 by applying current through lead 48. Thereafter, when it is in position 62, the magnet may be moved to position 64 by passing current through lead 46, rotated 90 degrees to position 66 by passing current through lead 50, and moved to position by passing current through lead 52. This procedure may be repeated, modified, interrupted, etc., to cause the magnet to move in different directions at different times.

As will apparent to those skilled in the art, a magnetized object may be caused to spin by the motor of this invention from, e.g., positon 56 to 59, then back to 56, then to 59 again. Other movement patterns may also be used depending upon the current furnished to the motor and the manner in which it is furnished.

One may cause spinning of the magnetized object by appropriate use of direct current pulses. Alternatively, or additionally, such spinning motion may be caused by use of alternating current.

Figure 8:
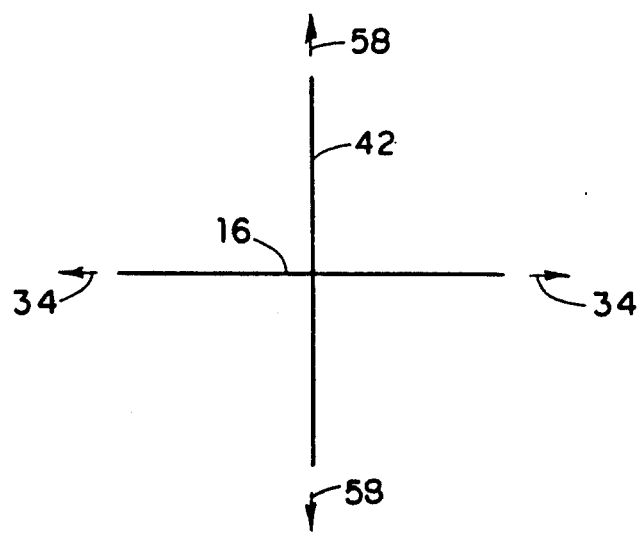
FIG. 8 shows the current directions which correspond to the motions described in FIG. 7.

Referring to FIG. 8, it will be seen that the current in conductor 14 can go in one of two different directions 34, as can the current in conductor 42 (in directions 59). It will be apparent to those skilled in the art that the polarity of the current supplied to said leads can readily be reversed by conventional control means.

Figure 9:
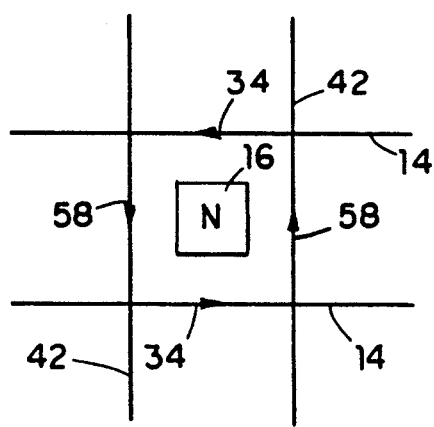
FIG. 9 is a top view of a single loop coil of the motor of FIG. 5.

FIG. 9 illustrates an embodiment of the invention in which a single-loop solenoid is formed from conductors 14 and 42 by selectively applying current to the leads of such conductors. This Figure is a top view of the apparatus of FIG. 5 from which the superconducting plate 12 has been omitted for the sake of simplicity.

Referring to FIG. 9, magnet 16 is attracted by the magnetic fields of conductors 14 and 42. Current is supplied to conductors 14 and 42 in such a manner and at such times that the current direction 34, 58, 34, and 58, is counterclockwise. Means for supplying such counterclockwise current through the leads of conductors 14 and 42 are well known to those skilled in the art. See, e.g., Sybil B. Parker's "McGraw-Hill Encyclopedia of Electronics and Computers" (McGraw-Hill Book Company, New York, 1984).

Figure 10:
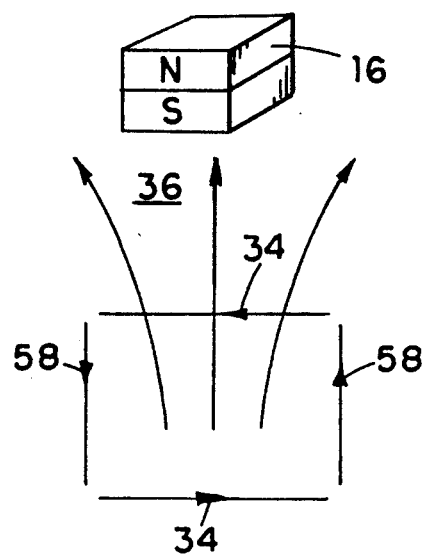
FIG. 10 is a perspective view of the embodiment of FIG. 9.

FIG. 10 illustrates the magnetic flux lines 36 created by the solenoid of FIG. 9. In the configuration depicted by this Figure, magnet 16 is attracted by the solenoid.

Figure 11:
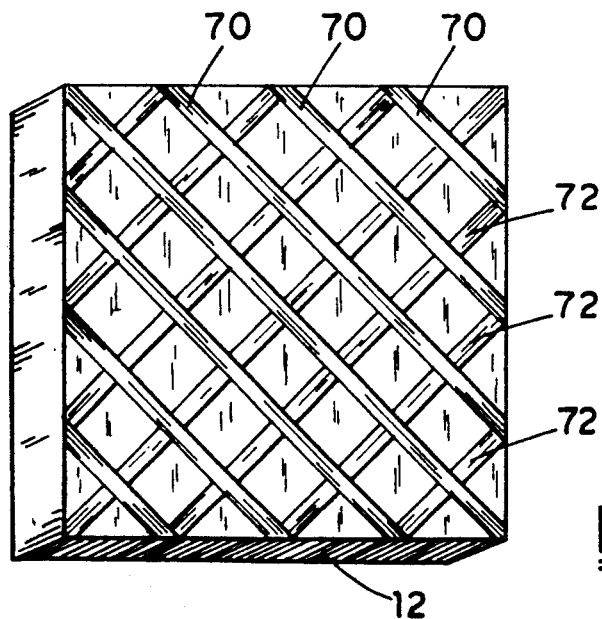
FIG. 11 is a perspective view of yet another preferred embodiment of the motor of this invention in which two-dimensional motion is obtainable.

FIG. 11 illustrates another embodiment of the invention in which conductors 70 and 72 are arranged in a diagonal pattern across the top of superconducting plate 12. It will be apparent to those skilled in the art that, in addition to the two patterns of conductors illustrated in the Figures, many other configurations may be used. Thus, e.g., the conductors may be curved, bent, spaced unequally from each other, spaced equally from each other, irregularly configured, and the like.

Figure 12:
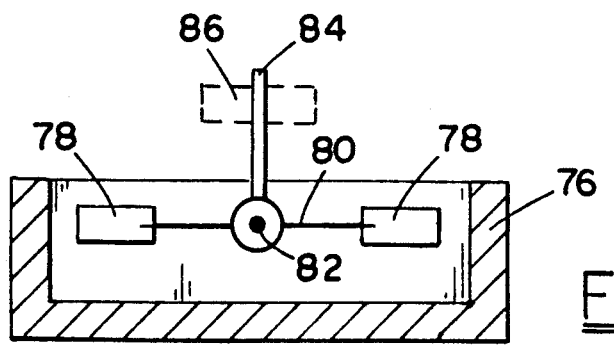
FIG. 12 is a cross-sectional view of a rotational motor.

FIG. 12 illustrates a rotational motor. In the embodiment of this Figure, superconductive U-shaped stator has a multiplicity of conductors 81 (shown in FIG. 13A) across its surface. Disposed above the superconductive surface is a magnetic rotor comprised of magnets 78, connecting arms 80, joint assembly 82, shaft 84, and load assembly 86. Each of the magnets 78 is affected by the electromagnetic fields created around the conductors 81 (shown in FIG. 13A); and, by suitable introduction of current through some of wires 81 at different times, the motor may be caused to rotate. The motion is confined in the U-shaped stator. This kind of motor is different from the conventional motors described by the Sen's book, supra.

By suitable processing techniques, superconductive materials can be formed into desired configurations, which will provide necessary magnetic field confinement of the magnetized object. Thus the orientation and/or positioning of the magnetized object can be controlled. Referring to FIG. 12, the confinement of the magnetic rotor (magnets 78) is achieved by making a U-shaped stator. Referring to FIG. 7, for example, the proper orientation and/or positioning of magnet 68 can be controlled by flux pinning, switching of electromagnetic field, and/or the geometrical configurations.

Figure 13:
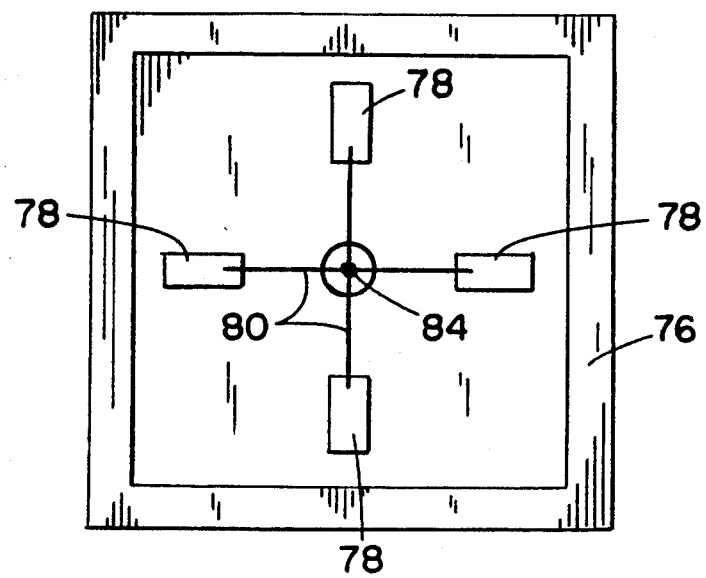
FIG. 13 is a top view of the embodiment of FIG. 12.

FIG. 13 is a top view of the rotational motor of FIG. 12, showing that it is comprised of four magnets 78. As will be apparent to those skilled in the art, more or fewer magnets may be used. It is preferred, for purposes of rotational stability, to utilize at least four magnets in this configuration.

Figure 13A:
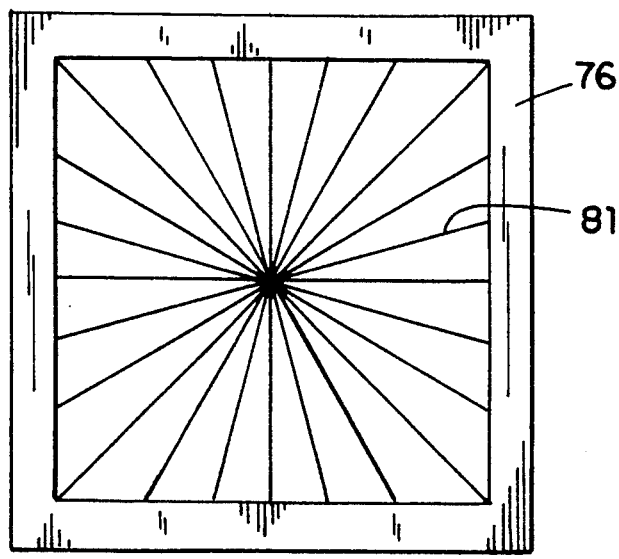
FIG. 13A is a partial top view of the base of the motor of FIG. 12 from which the stator has been omitted for the sake of simplicity.

Referring to FIG. 13A, it will be seen that the conductors are so spaced on the surface of superconductor stator 76 that they tend to induce rotational motion in said rotor when pulsed current is sequentially passed through adjacent conductors. It will be apparent to those skilled in the art that the radial pattern of conductors shown in FIG. 13A is only illustrative, and that many other patterns will suffice to induce rotational motion in a rotor similar to that shown in FIGS. 12 and 13. It will also be apparent to those skilled in the art that other rotors may be used.

Figure 14:
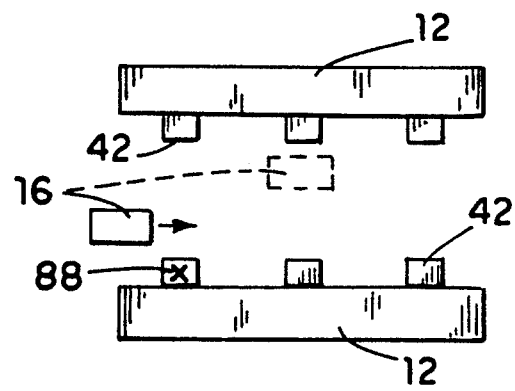
FIG. 14 is a cross-sectional view of yet another preferred motor of the invention in which three-dimensional movement may be obtained.

FIG. 14 illustrates a device for permitting three-dimensional motion in a magnet. The apparatus of this figure is comprised of super conductive plates 12, each of which is attached to a multiplicity of conductors 42. Magnet 16 is disposed between the top and bottom plates 12. In the embodiment illustrated in this Figure, current passing through left conductor 42 of bottom plate 12, in direction 88 (into the plane of the paper) will attract the north pole of magnet 16 and pull such magnet. A dashed block shown in this Figure illustrates the next location of the magnet 16, which is displaced both laterally and longitudinally from the original position of the magnet.

Figure 15:
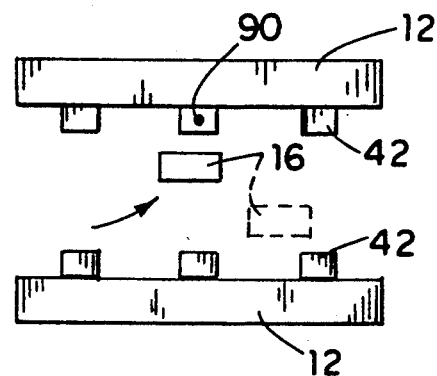
FIGS. 15 is a cross-sectional view of the motor of FIG. 14, showing a different position of the magnetized object caused by the motor.

FIG. 15 shows the magnet 16 having moved to the position depicted by the dashed block of FIG. 14. In the embodiment of FIG. 15, current is flowing through middle conductor 42 of the top plate 12 in the direction 90, away from the plane of the paper. A dashed block shown in this FIG. 15 illustrates the next position of the magnet 16, which is displaced both laterally and longitudinally from the position of FIG. 15.

Figure 16:
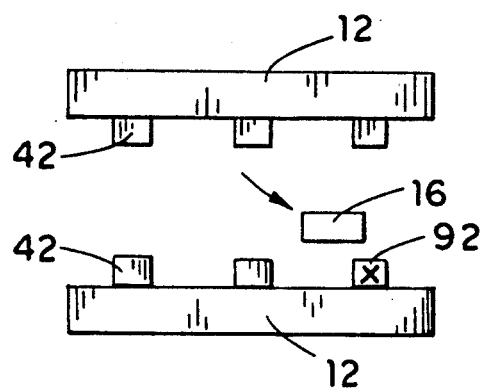
FIGS. 16 is a cross-sectional view of the motor of FIG. 14, showing a different position of the magnetized object caused by the motor.

FIG. 16 shows the magnet having moved to the position depicted by the dashed block of FIG. 15. In the embodiment of this Figure, current is flowing through the right conductor 42 of the bottom plate 12 in the direction 92 into the plane of the paper.

It will be apparent to those skilled in the art that a substantial number of different movements of the magnet 16 can be caused to occur by varying the timing, type, and amount of current passing through bottom and top conductors. Although the Figures have only illustrated current flowing through one conductor at a time, it is apparent that current may flow through more than one of such conductors, and that the magnet may be caused to move in a straight and/or curved path.

In one embodiment, not shown, one or both of top and bottom superconductive plates 12 will have the grid pattern depicted in FIG. 5. In another embodiment, not shown, one or both of the superconductive plates will have the diamond pattern depicted in FIG. 11. In yet another embodiment, not shown, one or both of the superconductive plates will have the radial pattern shown in FIG. 13A. Other combinations of patterns will be apparent to those skilled in the art. With one or more of these arrangments, the magnet 16 may be caused to move in one, two, or three dimensions.

Figure 17:
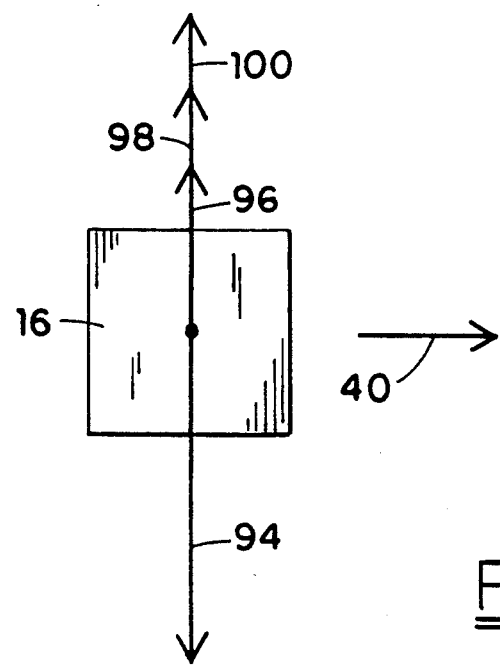
FIG. 17 is a force diagram corresponding to the motor of FIG. 14.

FIG. 17 is a force diagram illustrating forces which typically act upon magnet 16 when it is in the configuration depicted in FIG. 15. Force 94 represents the force of a gravity and, in addition, a small pinning force due to flux trapping in bottom superconductive plate 12; such a pinning force was discussed in an earlier portion of this specification and is referred to in the Davis et al. paper mentioned therein. In the configuration of FIG. 15, the bottom plate 12 is preferably constructed so that it has many fewer pinning centers than the top plate 12.

Force 96 is the attractive force between the magnet and the electromagnetic field created by the current through conductor 42 in direction 90 (see FIG. 15).

Force 98 is the pinning force on the magnet due to flux pinning caused by the "dirtiness" of the top superconductive plate 12. Flux pinning of this sort was discussed by a paper by P.N. Peters et al entitled "Observation of enhanced properties in samples of silver oxide doped $YBa_2Cu_3O_x$." (Applied Physics Letters, 52 [24], Jun. 13, 1988). Such "dirtiness" in a superconductor refers to the presence of an increased number of pinning centers. One can increase the number of pinning centers in a superconductor by well known means. Thus, for example, one may dope the superconducting powders used to make the shaped object with silver oxides (see, e.g., the Peters et al. paper). Alternatively, one may melt the pellet used to make the superconductive plate at a very high temperature (in excess of about 1,100 degrees centigrade) and then quench it to a lower temperature (about ambient) at a rate of at least 1000 degrees per minute; this treatment creates some non-superconducting phases such as a yttrium-2, barium-1, copper-1 phase.

Force 100 is the net Meissner force from the bottom and the top superconductive plates. Because the top superconductive plate is preferably designed to be much "dirtier" than the bottom (and to thus contain less superconducting phase), the Meissner effect from the bottom plate is substantially stronger than that from the top. In general, the Meissner effect from the bottom plate is at least about 2 times as great as the Meissner effect from the top plate in this embodiment.

Figure 18:
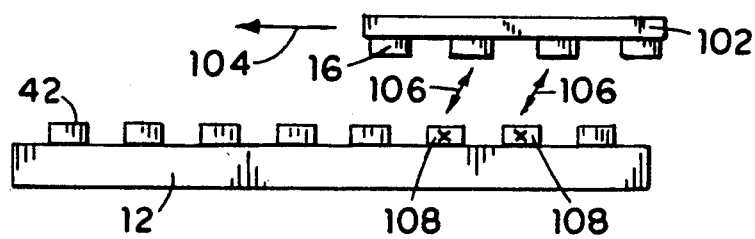
FIG. 18 is a cross-sectional view of a preferred embodiment of the invention which allows stable motion to be achieved.
Figure 19:
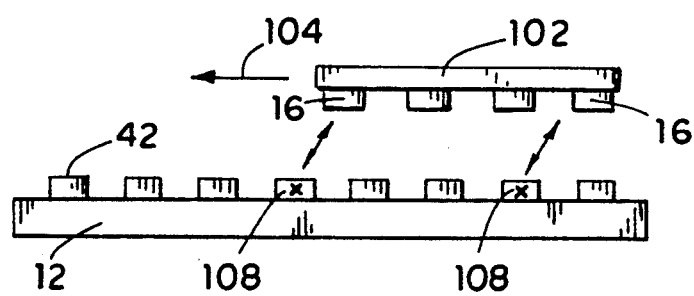
FIG. 19 is a cross-sectional view of a preferred embodiment of the invention which allows stable motion to be achieved.

FIG. 18 illustrates a stepped linear motor with increased stability. In the embodiment of this Figure, connecting means 102 is attached to four magnets 16; the use of a multiplicity of magnets in the motor of this embodiment provides increased stability. As is shown in this Figure, the interior conductors 42 closest to the inside magnets 16 are activated by passing current in the direction of 108 (into the plane of the paper). The net force will move the assembly forward, in direction 104. This will bring the assembly to a new location (see FIG. 19) where exterior conductors 42 are now closer to the outside magnets. Now, current may be passed in direction 108 through exterior conductors 42; and the assembly will continue to be pulled in direction 104.

Figure 20:
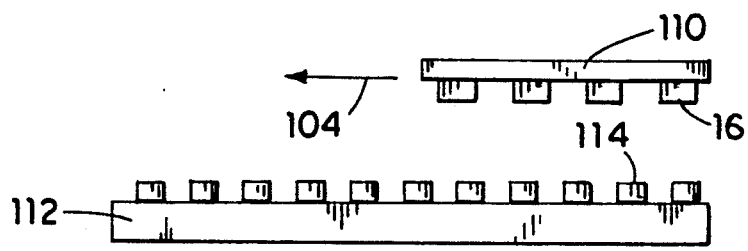
FIG. 20 is a cross-sectional view of a preferred embodiment of the invention which allows stable motion to be achieved.

FIG. 20 illustrates a two-phase, synchronous alternating current motor comprised of stator 112 which contains a superconductive plate and a multiplicity of conductors 114. A magnetic "rotor" 110 is comprised of a multiplicity of magnets 16 joined by a connecting means. When a suitable, two-phase alternating current is impressed upon conductors 114, the rotor 110 is caused to move in direction 104.

Figure 21:
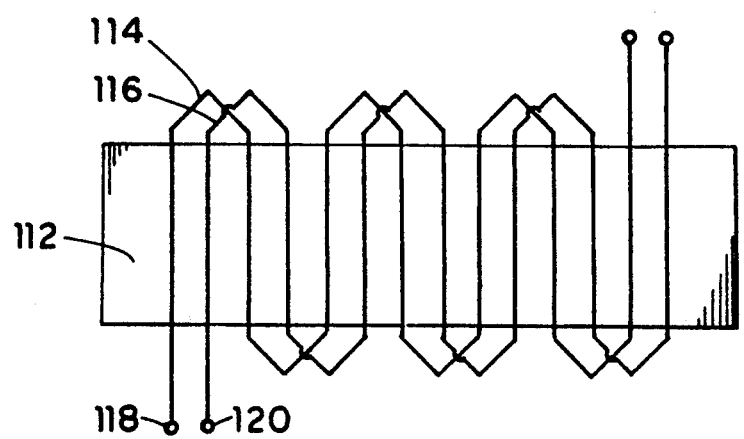
FIG. 21 is a two-phase wiring diagram for a synchronous motor.

FIG. 21 is a wiring diagram for the apparatus of FIG. 20. Suitable alternating currents, each with a voltage of from about 1 to about 10 volts and a frequency of from about 1 herz to about 1,000 herz, are preferably imposed across input terminals 118 and 120. Each of these alternating currents is out of phase with each other. In one preferred embodiment, this phase difference is 180 degrees. The spacing between the magnets 16 is preferably substantially uniform; and the spacing between the conductors 114 is preferably substantially uniform.

As will be apparent to those skilled in the art, by a proper choice of phase relationships and the polarity of the magnets used, one can either pull or push the rotor 110 leftwards or rightwards.

In another embodiment, the alternating currents may have phase differences other than 180 degrees. In these embodiments, it is preferred that the spacing between the magnets 16 and the spacing between the conductors 114 should be changed in accordance with the changed phase difference.

Figure 22:
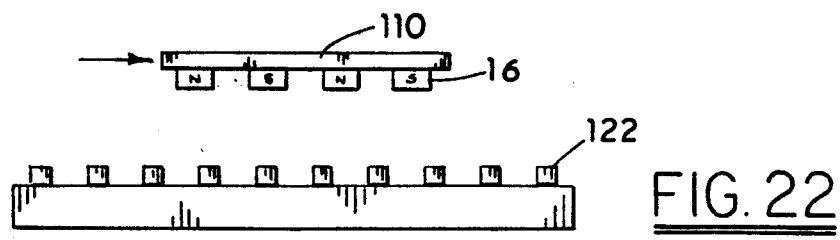
FIG. 22 is a cross-sectional view of a synchronous motor.
Figure 22A:
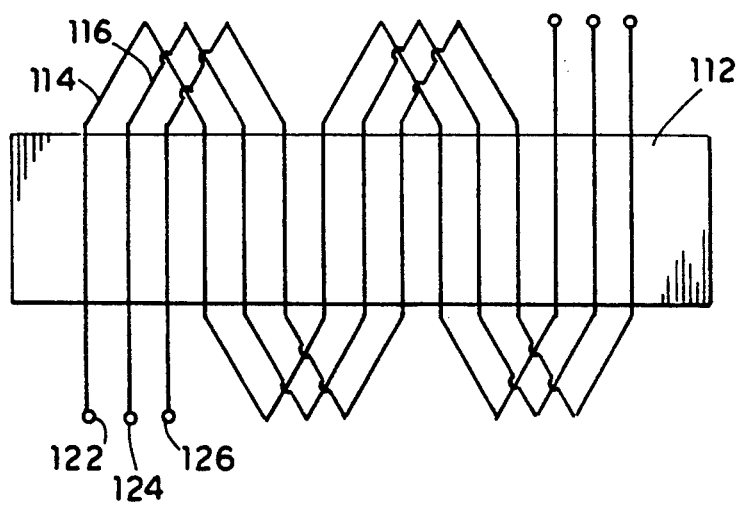
FIG. 22A is a three-phase wiring diagram for a synchronous motor.

FIG. 22 illustrates a three-phase, linear, synchronous alternating current motor comprised of elements similar to the apparatus of FIG. 21. FIG. 22A is a wiring diagram illustrating how to provide three-phase alternating current to the apparatus of FIG. 22. Three separate alternating currents with voltages and frequencies preferably similar to those described for the preferred embodiment of FIG. 21, are used; these alternating currents are imposed across terminals 122, 124, and 126, respectively. In one embodiment, each of the alternating currents imposed across these terminals are about 120 degrees out of phase; in this embodiment, the spacing between the magnets is substantially uniform, as is the spacing between the conductors; however, the spacing between the magnets need not be the same as the spacing between the conductors. In another embodiment, the alternating currents imposed acorss these terminals have phase differences other than 120 degrees; in this embodiment, the spacing between the magnets and between the conductors is preferably not uniform.

Figure 23:
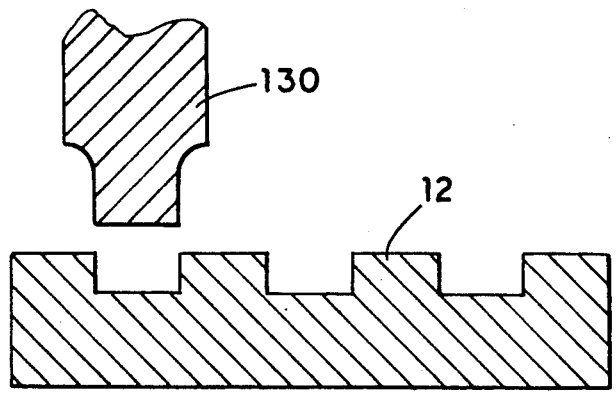
FIG. 23 illustrates mechanical means for cutting a groove into a superconductive substrate.

FIG. 23 illustrates one means of making grooves in the surface of plate 12 into which conducting wires 14 may be placed. In the embodiment illustrated in FIG. 23, a cutting device (such as a diamond saw 130) is used to cut the grooves into the surface of the plate.

Figure 24:
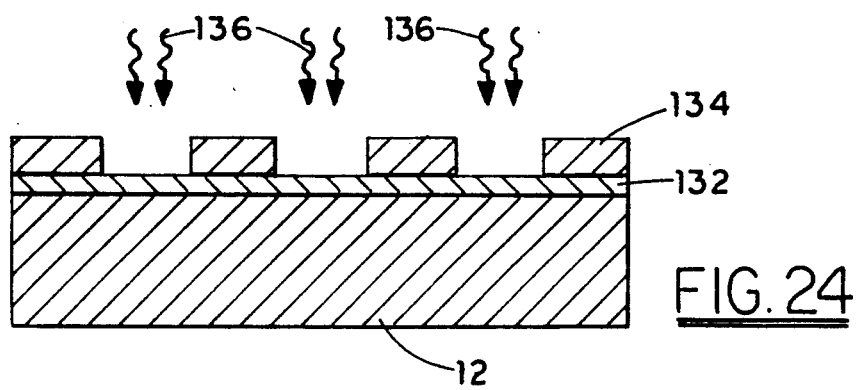
FIGS. 24 and 24A illustrate a lithographic method for cutting grooves into a superconductive substrate.
Figure 24A:
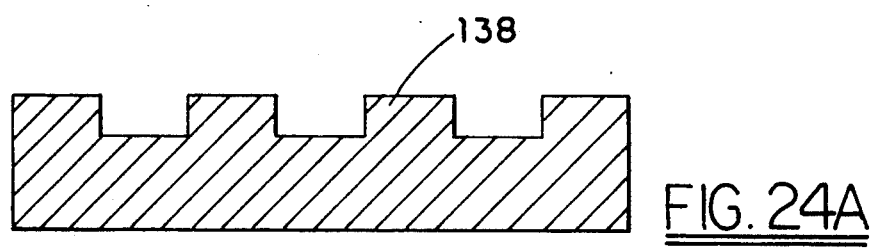

FIG. 24 illustrates another means of making grooves in the surface of plate 12 by chemical etching. This method is well known to those skilled in the art; see, e.g., an article by I. Shih et al. entitled "Chemical etching of Y-Cu-Ba-O thin films" (Applied Physics Letters 52 [18], May 2, 1988). As is illustrated in FIG. 24 coated with a suitable photoresistive material 132 (such as an emulsion). This lithographic technique is well known to those in the art and is described in, e.g., pages 980–982 of Serope Kalpakjian's "Manufacturing Engineering and Technology," (Addison-Wesley Publishing Company, Reading, Mass., 1989).

Referring again to FIG. 24, after photoresistive emulsion 132 has been coated upon a polished superconductive plate 12, mask 134 is placed on top of the coated plate 12, and the photoresistive material is exposed to light (such as ultraviolet light) through selective openings in mask 134. After development, the surface of coated plate 112 is then etched, thereby creating grooves, as is shown as etched plate 138.

Figure 25:
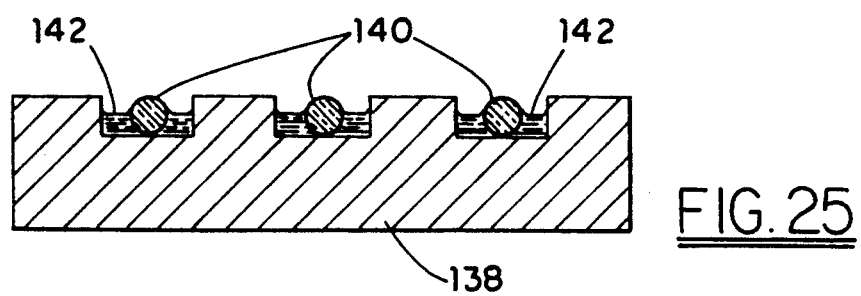
FIG. 25 is a sectional view illustrating the positions of the conductors within grooves in a superconductive substrate in one preferred embodiment of the invention.

FIG. 25 illustrates the placement of insulating material 142 in between etched plate 138 and conductors 140. In one preferred embodiment, epoxy adhesive (such as the epoxy 1266 referred to in another portion of this specification) is applied to the etched grooves, and then conductors 140 are placed in the grooves and secured thereto.

Figure 26:
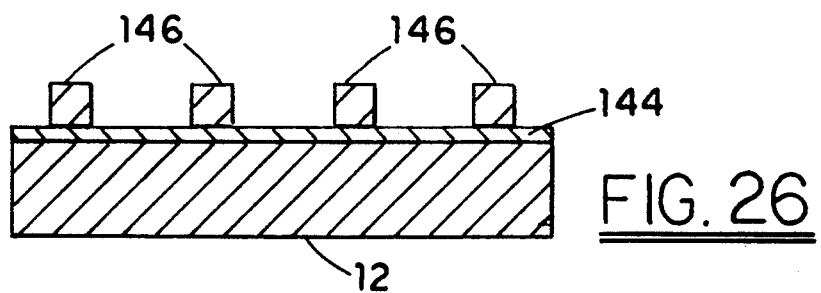
FIG. 26 is a partial sectional view illustrating an insulating layer of one preferred embodiment.

FIG. 26 illustrates another preferred embodiment in which an insulating layer 144 (such as a layer of epoxy resin, or a vapor deposited layer of insulating material) is bonded to the surface of plate 12, and thereafter conductors 46 are bonded to insulating layer 144, preferably by means of evaporation of the conductive material (such as copper, silver, gold, or aluminum) onto the layer 144. Thus, one may use thermal evaporation, direct current sputtering, radio frequency sputtering, electron beam evaporation, flame or plasma spray, thick film processing, and the like, to deposit the conductors onto the insulating layer 144.

Figure 27:
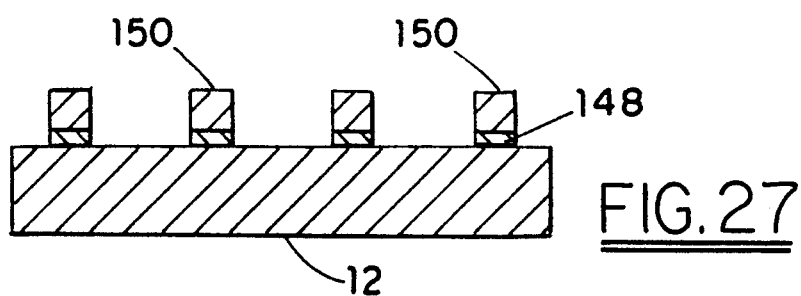
FIG. 27 is a partial sectional view illustrating insulating layers of one preferred embodiment.

FIG. 27 illustrates an embodiment in which strips of insulating material 148 are used instead of insulating layer 144, and conductors 150 are bonded to strips 148, preferably by means of evaporation.

Figure 28:
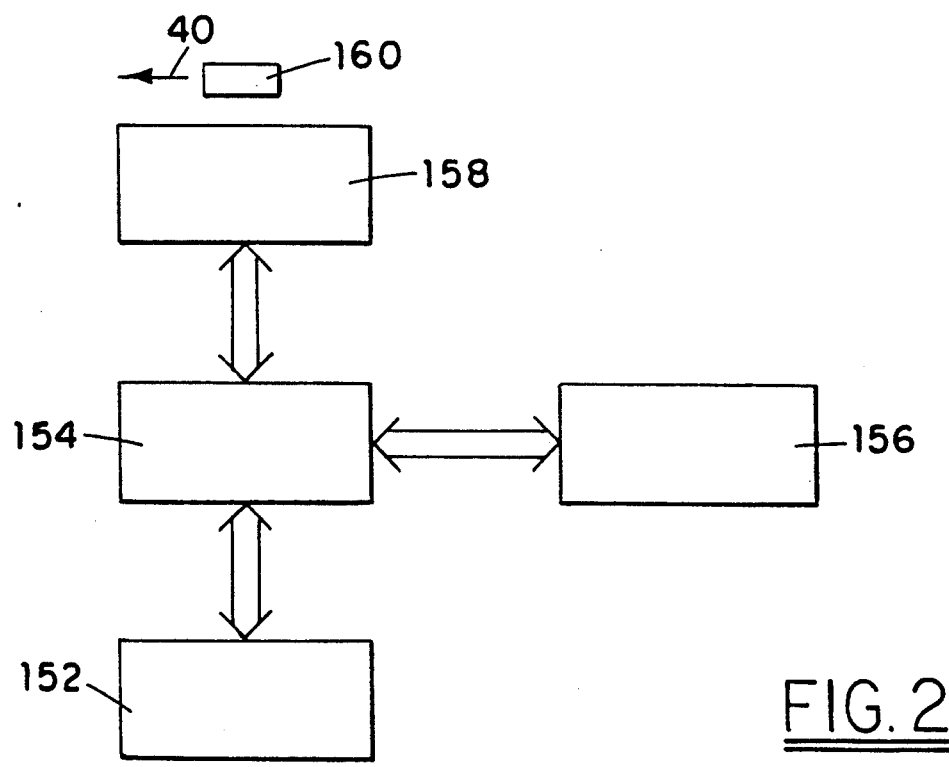
FIG. 28 is a block diagram of one control means which may be used in the applicants' invention.

FIG. 28 illustrates a means of providing suitable direct and/or alternating currents to the apparatuses described in the prior figures. Referring to FIG. 28, microcomputer 152 is electrically connected to control circuit 154 (described in more detail in FIG. 29) to which power is supplied by power supply 156. The output from circuit 154 is fed to 158, thus causing magnetic assembly 160 to move in direction 40.

Figure 29:
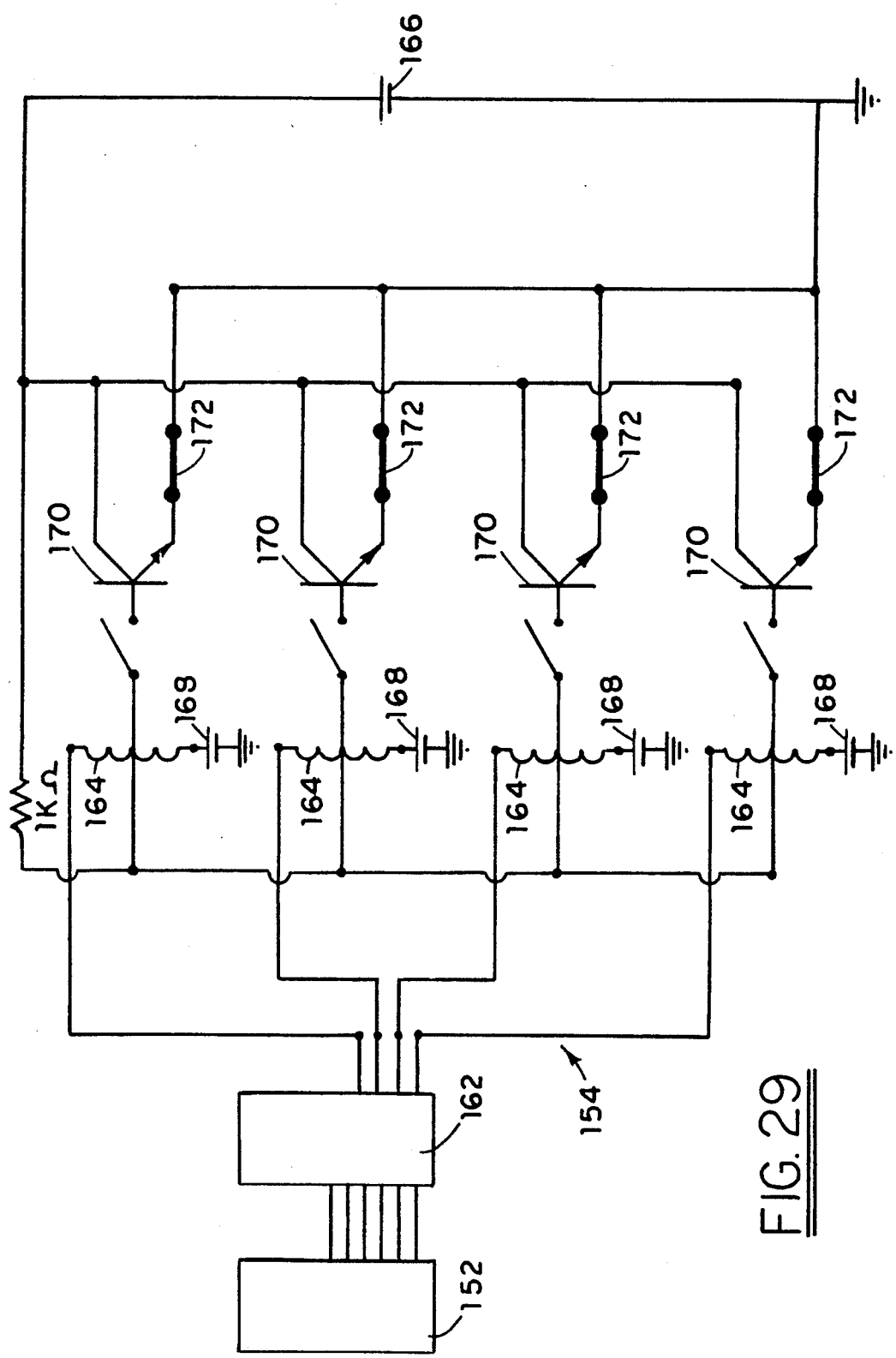
FIG. 29 is a schematic of one preferred circuit which may be used in applicants' devices.

FIG. 29 illustrates one preferred embodiment of control circuit 154. Referring to FIG. 29, control circuit 154 is comprised of multiduplexer circuit 162, which is electrically connected to mechanical relays 164 which, in turn, open and close the switch to the bases of power transistors 170. The outputs from power transistors 170 is fed through lines 172 to conductors on the motors. Bias voltage for the power transistors is provided by power supply 166. Bias for the relays 164 is provided by the power supply 168, which can be obtained from the microcomputer 152 or other sources.

In one embodiment, not shown, other switching means are substituted for the mechanical relays shown in FIG. 29.

Figure 30:
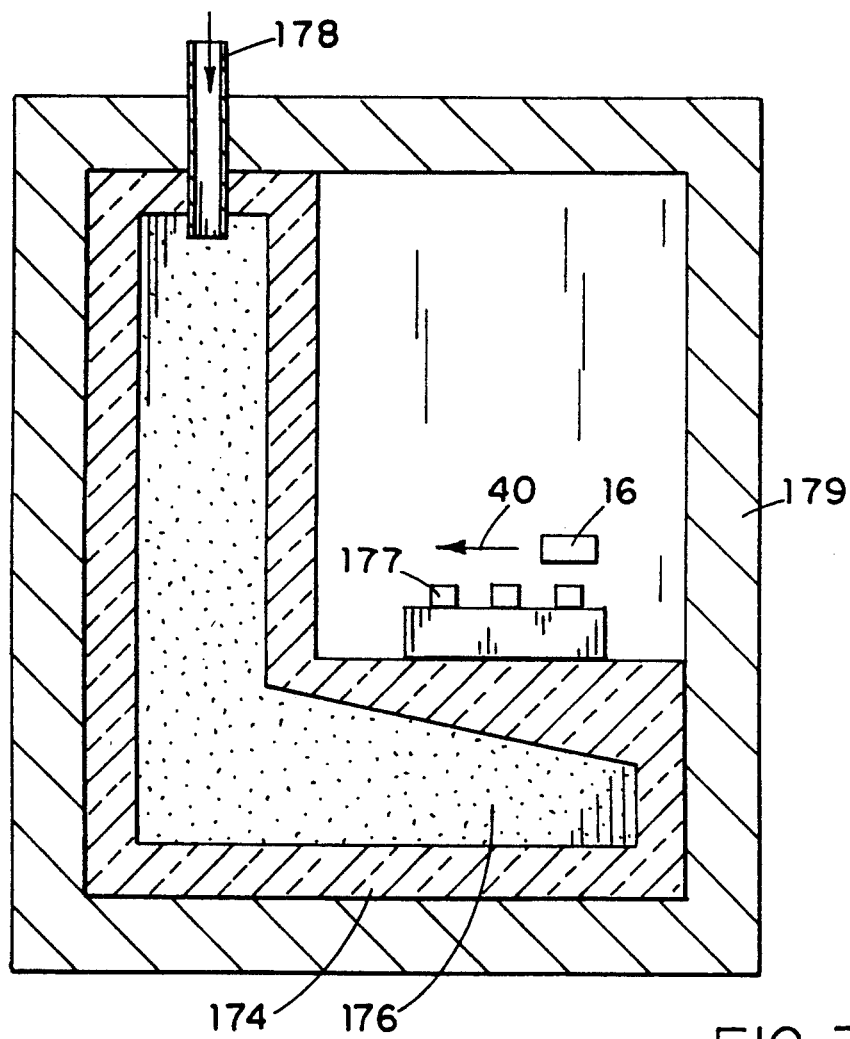
FIG. 30 is a cross-sectional view of one preferred means for cooling one preferred embodiment of the motor of this invention.

FIG. 30 illustrates a means of cooling the superconductive material of plates 12 below their critical temperatures. Referring to FIG. 30, cooling chamber 174 is preferably made of a material with relatively high thermal conductivity, such as copper. It is important that, at that portion of the cooling chamber where contact is made between the chamber and the superconductive motor assembly, good thermal contact exist and that the materials of the chamber are such that there is efficient heat transfer between the superconductive material and the cooling means within chamber 174. However, in one embodiment, not shown, those portions of the chamber 174 which are not in contact with the superconductive motor assembly are made of materials with poor thermal conductivity (such as stainless steel, which is a metal, and has low thermal conductivity), and constructed to give a tortuous thermal conducting path. This will assure poor heat transfer between the environment outside of the chamber and the other portion of the chamber, thereby ensuring that the cooling capability of the cooling means will not be wasted.

The chamber 174 is comprised of inlet 178 which serves to allow one to insert liquid nitrogen 176 (or other cooling means, such as liquid helium or its vapor, or other cryogenic cooling means) and also serves as a vapor outlet. Superconducting plate 175, comprised of conductors 177, sits upon a portion of chamber 174. It is essential to insure that there is good thermal contact between plate 175 and chamber 174 to suitably cool the superconductor. The cooling apparatus of this Figure is enclosed in protective means 179 designed to minimize heat exchange between the inside of the enclosure and the outside environment. The preferred embodiment illustrated in the Figure has a slope inside of the chamber to allow vapor to escape from the chamber through inlet/outlet 178.

Figure 30A:
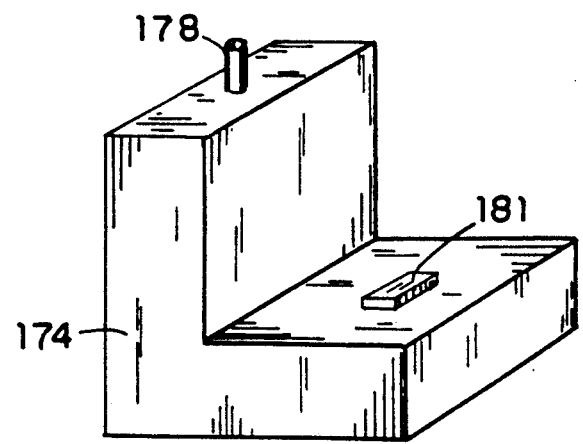
FIG. 30A is a perspective view of the embodiment of FIG. 30.

FIG. 30A is a perspective view of the embodiment of FIG. 30.

Figure 31:
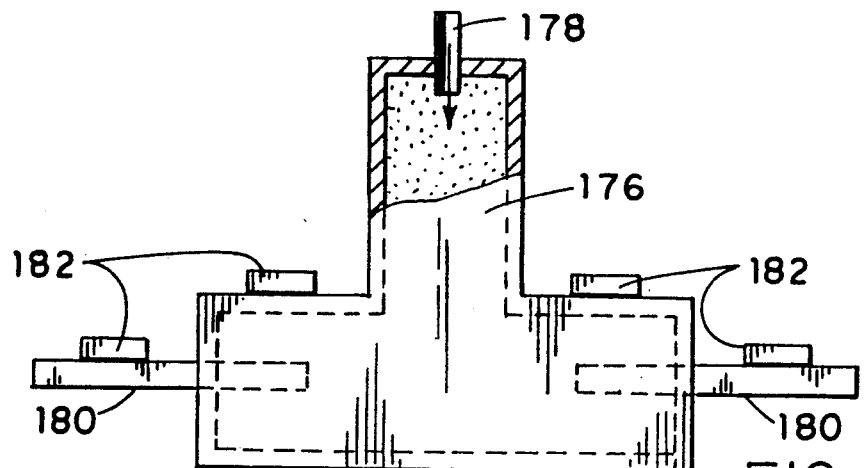
FIG. 31 is a partial sectional view of yet another preferred means for cooling the motors of the invention.

FIG. 31 illustrates another means for cooling the superconductive motors. In this embodiment, additional cooling platforms 180 are used to cool superconductive motor assemblies 182. It is apparent to those skilled in the arts, that other cooling means can also be used to cool the motor assemblies 182; for example, cooling extensions such as metallic ribbons can be used. In principle, any material with good thermal conductivity can be utilized. The platforms 180 preferably consist essentially of material with good thermal conductivity, such as copper. The apparatus of this Figure allows the operation of several superconductive motor assemblies at the same time, acting independently or dependently.

Figure 32:
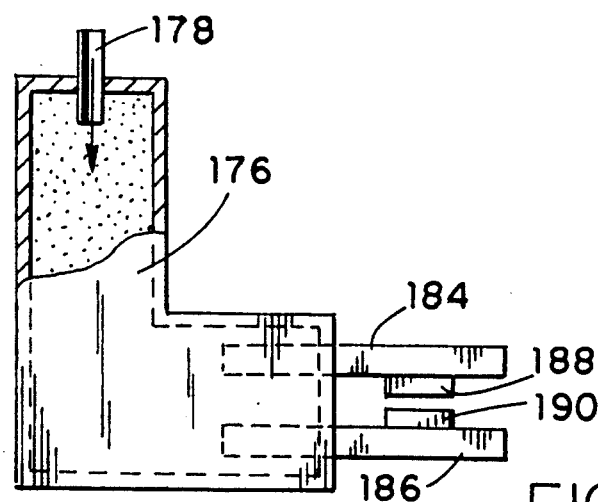
FIG. 32 is a partial sectional view of yet another preferred means for cooling the motors of the invention.

FIG. 32 illustrates a means for cooling the three-dimensional stepped motors illustrated in FIGS. 14, 15, and 16. In this embodiment, the cooling means is comprised of top cooling platform 184 (to which superconductive plate 188 is attached) and bottom cooling platform 186 (to which superconducting plate 190 is attached).

Figure 33:
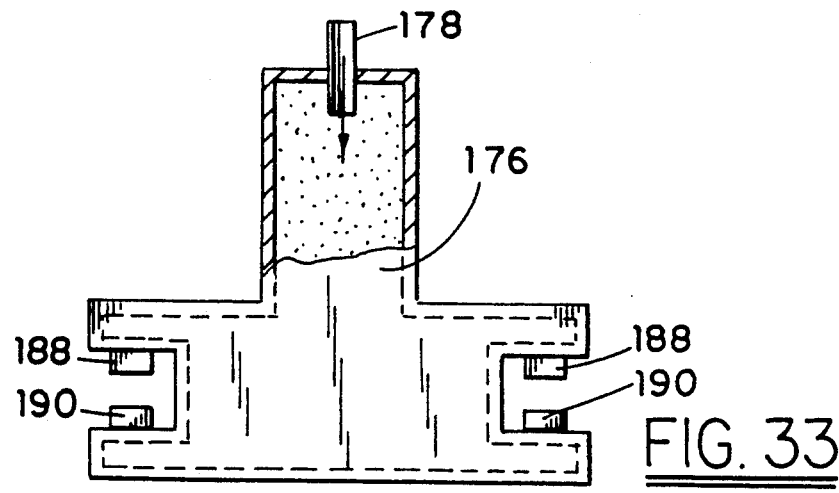
FIG. 33 is a partial sectional view of yet another preferred means for cooling the motors of the invention.

FIG. 33 illustrates another means for cooling superconductive plates 188 and 190. In one embodiment, this cooling means has a circular notch; and each of the superconducting motors 188 and 190 may act independently or dependently. In one embodiment, the top plate of the superconductive motor assembly has a substantially circular shape, and the bottom plate has a similar shape; the magnet 16 thus can go in a circular path, which can be a spiral path.

Figure 34:
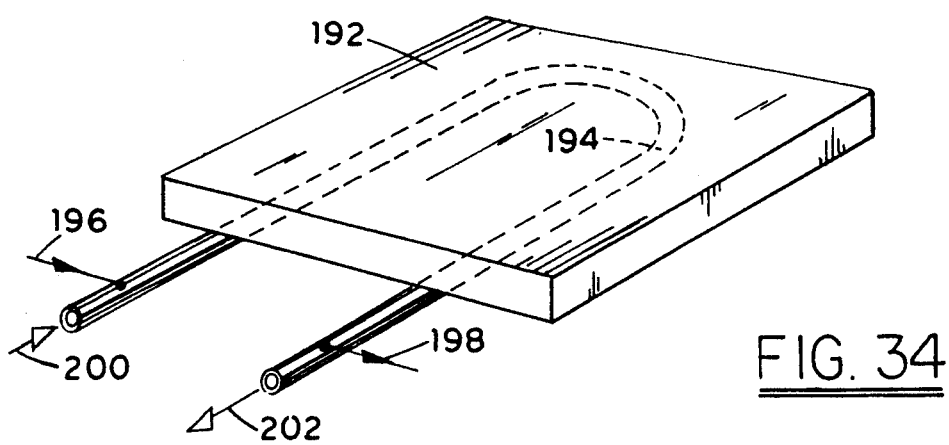
FIG. 34 is a partial perspective view of one preferred means for cooling the motors of the invention.
Figure 34A:
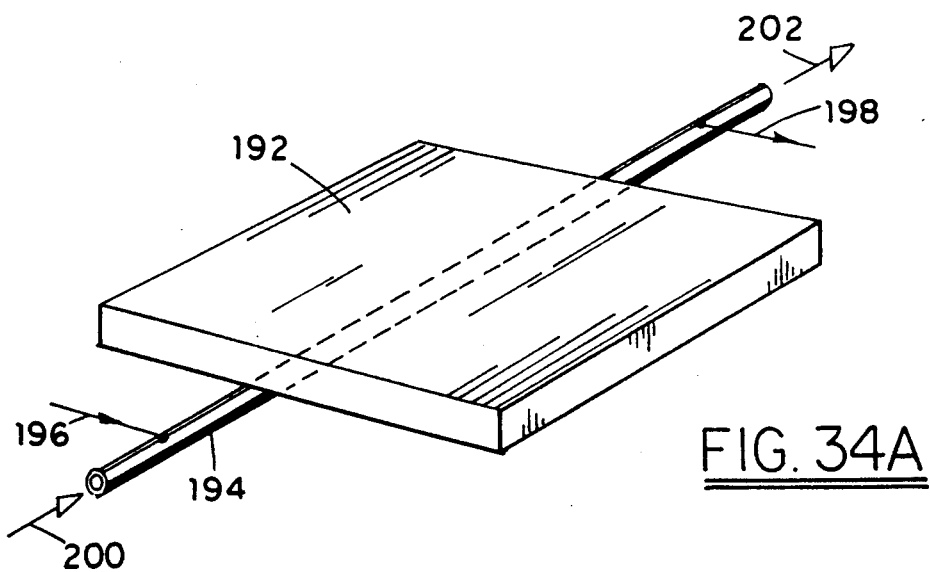
FIG. 34A is another partial perspective view of yet another means for cooling the motors of the invention.

FIG. 34 and 34A are yet other configurations to provide cooling to superconducting material 192. A hollow tube or capillary 194 has coolant inlet 200 and outlet 202. The electrical current can also be passed through either the walls of tube 194, or conducting strips attached to the tube 194. The electrical leads are marked as 196 and 198, which can be used in the same configurations as conductor 14 of FIG. 1, or in similar configurations.

The stepper motor of this invention is contactless. As used in this specification, the term contactless refers to a motor in which there is no physical contact between the part being moved (such as the rotor) and the rest of the motor (such as the stator). Because applicants' motor is contactless, it has a larger energy conversion efficiency than prior art stepper motors.

In one embodiment, not shown, the stepper motor of the invention is encased in a vacuum chamber to reduce the air drag upon the moving part(s).

The stepper motor of this invention is multi-dimensional, that is, it has the capability of moving a magnetized object in any one of the following dimensions: horizontally (x axis), vertically (y axis), up/down (z axis), circularly (in either two or three dimensions), spirally (in either two or three dimensions), and the like. Furthermore, the magnetized object can be moved in an irregular pattern in either two or three dimensions, one can alternate the direction of movement in two or more dimensions (and thus cause spinning), and one can stop and start the motion at any time and at any point. Unlike prior art motors, the magnetized object can be moved in an extraordinarily large number of directions and ways and speeds. This versatility, in addition to the small size of applicants' motor, makes such motor especially useful for separation/filtration of magnetized particles, material handling, pointing, positioning, polar orientation of magnetized objects, and the like.

In one embodiment, a separation/filtration device can be used to filter out materials with different magnetic properties which may exhibit paramagnetism, antiparamagnetism, ferromagnetism, antiferromagnetism, diamagnetism, ferrimagnetism, etc. The degree of magnetization of the materials affects the degree to which they act upon or are acted upon by the device of this invention. Furthermore, the size and the polar distribution of the particles also affect the degree to which they interact with the device. Thus, one may selectively filter out undesired particles based upon their size and/or the magnetic properties. Such a process may thus be used to separate minerals, blood cells, and the like.

In another embodiment, a conveyor system comprised of one or more of the motors of this invention can be used for mass transfer purposes. The object(s) to be transferred may either be a magnetic object(s) or a nonmagnetic object(s) encased in or supported by a magnetized carrier. Alternatively, the superconductive primary element(s) may be moved, and the magnetized secondary element(s) may remain stationary.

In a third embodiment, the device of this invention may be used to perform the functions of pointing and/or positioning and/or polar orientation which are conducted in a manner substantially similar to those used in a gyroscope. It will be apparent that the motors of this invention can be used in devices other than gyroscopes to perform similar functions.

The motor of this invention has the advantage of low noise and wear, together with high efficiency because of its contactless feature. These advantages may be put to good use, e.g., to create contactless gearing systems. Thus, for example, any of the prior art gearing systems described, e.g., in pages 400–448 of R. H. Creamer's "Machine Design," Third Edition (Addison-Wesley Publishing Company, Reading, Mass., 1984), may be replaced by a contactless gearing assembly in which the gears interact by the magnetic principles of this invention. Linear motion may be achieved in this manner by using the motor, e.g., illustrated in FIG. 1. Planar motion may be achieved in this manner by using the motor, e.g., of FIG. 5. Three-dimensional motion may be achieved in this manner by using the motor, e.g., of FIGS. 5B and 5C. Rotational motion may be achieved in this manner by using the motor of, e.g., FIGS. 7 and 12.

In one embodiment, not shown, two or more substantially rectangular grids with substantially rectangular orifices in them are positioned facing each other, being separated from each other by the Meissner effect described above; one of these may be a magnetized object, and the other of these may comprise superconductive elements. By the use of applicant's invention, these grids may be stably diposed in a multiplicity of different positons vis-a-vis each other, may be moved very precisely to different positons and/or locations, and may be used to carry other objects, such as small electronic parts. Thus such grid-motor can be used in a precision-assembly equipment for mounting miniture electronic parts. It will be apparent that this embodiment is not limited to rectangular objects and/or objects with rectangular orifices.

The stepper motor of this invention is small, that is, its maximum dimension (taken horizontally, vertically, or up/down) is less than about 10 centimeters. In one preferred embodiment, the maximum dimension of applicants' motor is less than about 5 centimeters. In another embodiment, the maximum dimension of the motor is less than about 3 centimeters.

In one embodiment, the length and width of the motor are substantially equal, being from about 0.8 to about 1.2 times each other.

The motor of this invention is comprised of at least one superconductive primary suspending element. Such suspending element is comprised of at last about 50 volume percent of one or more of the superconductive materials. It is preferred that the suspending elements comprise at least about 60 volume percent of the superconducting material. It is even more preferred that the suspending elements comprise at least about 70 volume percent of superconducting material. In one preferred embodiment, the suspending elements consist essentially of superconductive material.

Such suspending elements may be connected to each other by structural means which may, but need not contain, superconductive material. Thus, referring to FIG. 5C, rods 55 need not consist of superconductive material. Such suspending elements may be mounted on a substrate which may be, but need not be, comprised of superconductive material. Thus, referring to FIG. 5A, superconducting squares 49 are mounted on a substrate which may be, e.g., made of alumina insulator.

The superconducting material(s) which comprise said suspending elements has a first critical field greater than about 10 Gauss. It is preferred that such superconducting material have a first critical field greater than about 100 Gauss. In one embodiment, the first critical field of the superconducting material is greater than about 500 Gauss.

The superconducting material(s) comprising the suspending elements have a second critical field value of at least one Tesla. It is preferred that the second critical field value of the superconducting material be at least about 10 Tesla.

The critical temperature of the superconducting material used in the suspending element(s) is at least about 35 degrees Kelvin. It is preferred that such critical temperature be at least about 77 degrees Kelvin.

The superconducting material which comprises the suspending element(s) has a flux penetration ratio of from about 0.01 to about 0.1. The flux penetration ratio of a material may be determined by first forming the material into a circular plate with a diameter of 5 centimeters and a thickness of 3 millimeters. Then this plate is exposed to an electromagnet with a field strength of 500 Gauss. The tip of the electromagnetic pole is at a distance of 1 centimeter above the center of the top face of the plate; and the cross-sectional area of such tip is 0.5 square centimeter. Consequently, the field applied in this test is confined to an area of about 1 square centimeter around the center of the plate. A Hall probe, obtained from Bell Communications Company of Florida, is placed 1 centimeter away from the center of the opposing, lower face of the circular plate, and the Hall probe is then electrically connected to a Gauss meter obtained from the Bell Communications Company of Florida; the extent to which the magnetic field penetrated through the superconductive plate is then measured. The flux penetration ratio is the ratio between the penetrative field measured 1 centimeter below the bottom face of the plate to the applied field, measured 1 centimeter above the top face of the plate.

The stepper motor of this invention contains at least two primary conductive elements. In one embodiment, said motor contains at least 5 such conductive elements.

As used in this specification, the term primary conductive element refers a conductive material which, preferably, is in the form of wire. In one preferred embodiment, the conductive element is formed via thermal vapor deposition technique. In yet another embodiment, the conductive element is obtained by the thick film printing technique. In yet another embodiment, conventional straight copper wires obtained from Newark Electronic Company with a wire gauge (AWG) of from about 10 to about 40 is used.

In the stepper motor of this invention, the primary conductive elements are so disposed on or in the superconducting primary suspending element so that each of such primary conductive elements is separated from each adjacent primary conductive element by a distance of from about 0.01 to about 10 millimeters. The term adjacent, as used in this specification, refers to conductive elements which are in the same plane and in substantially the same direction. Thus, referring to FIG. 5, conductors 14 are adjacent to each other, and conductors 42 are adjacent to each other, but conductors 14 are not adjacent to conductors 42. The distance between adjacent conductors 14 is from about 0.01 to about 10 millimeters. The distance between conductors 14 and 42 is not always from about 0.01 to about 10 millimeters.

The conductive elements are generally electrically insulated from each other. Thus, referring again to FIG. 5, although conductors 42 often lay on the top of conductors 14 at certain points, each of these conductors is insulated by electrically insulative material.

The stepper motor of this invention is comprised of at least one magnetized article. The largest dimension of any such magnetized article is less than about 1 centimeter.

The magnetized article(s) used in the stepper motor of this invention has a magentic moment between the aforementioned first critical field value (greater than 10 Gauss) and the second critical field value (at least one Tesla).

The following examples are presented to illustrate the claimed invention but are not to be deemed limitative thereof. Unless otherwise stated, all parts are by weight and all temperatures are in degrees centigrade.

EXAMPLE 1

16.95 grams of yttrium oxide (obtained from Alfa Products, Danvers, Mass., Cat. no. 87829), 59.23 grams of barium carbonate (Fisher Scientific Corp., Springfield, N.J., 1988 Catalog no. B30-500), and 35.82 grams of copper oxide (J. T. Baker Inc., Phillipsburg, N.J., Cat. no. 1814-01) were mixed using a ball mill. The wet ball milling procedure consisted of placing the powders into a 500 milliliter plastic bottle, adding zirconia ball milling media, adding enough distilled water as the liquid medium to make up a 50 weight percent solution, and placing it onto rollers revolving at 60 revolutions per minute to cause the zirconia media to tumble and thoroughly mix the slurry of powder and distilled water. After 24 hours, the slurry was removed, and it was then dried at 80 degrees centigrade for 5 hours until it was substantially bone dry. The dried material was then ground in a mortar and pestle for 10 minutes to produce a fine, loose powder.

The ground powder mixture was calcined by setting the powder evenly and loosely onto a zirconia setter, and placing the setter into a furnace (Lindberg box furnace, model 10,549-110C, purchased from the Fisher Scientific Company, Springfield, N.J.; see page 539 of 1988 Fisher catalog) which was programmed for a specific firing schedule. Starting at ambient temperature, the furnace was heated to 925 degrees centigrade with a heating rate of 300 degrees centigrade per hour. It was held at this temperature for 12 hours and then allowed to cool to ambient at approximately 60 degrees per hour. The entire calcination procedure occured under flowing oxygen (10 cubic centimeters per minute).

The ball milling and calcination procedure was then substantially repeated with the treated powder that was obtained from the first heat treatment, with the exception that the distilled water was replaced with hexane (Fisher Scientific Corporation, Cat. no. H302-4). After the second calcination, the superconducting powder was again ball milled, dried, and ground to obtain a fine and advantageous particle size distribution, all of which occurred substantially in the manner described above.

The treated powder was then sieved through a no. 325 mesh screen, so that the resulting powder would have a particle size no greater than 44 microns.

A sample of this sieved powder was analyzed to test its purity. X-ray powder diffraction was conducted on a Siemens D-500 Diffractometer (model number C72298-A223-B-9-POZ-288, manufactured by Siemens Company of West Germany) using copper alpha K-radiation and a diffracted beam graphite monochrometer. Analysis revealed a pure $YBa_2Cu_3O_{7-x}$ phase.

Compaction of the powder into the desired shape was accomplished with a square, steel and brass die with internal dimensions of 1.83 centimeters by 1.83 centimeters. The die was a three part assembly that is comprised of two shafts and a shaft housing. Approximately 3 grams of powder were placed into the die and pressed with 8,000 pounds per square inch of pressure, which gave a powder compaction thickness of approximately 1.5 millimeters. After the pressing procedure, an article with square dimensions, 1.83 centimeters per side, was obtained.

The pressed article was then heated to 950 degrees centigrade in the aforementioned Lindberg box furnace at a heating rate of 300 degrees centigrade per hour, held at this temperature for 24 hours, cooled to 500 degrees centigrade at a rate of 100 degrees centigrade per hour, maintained at this annealing temperature for 24 hours, and then allowed to cool to ambient temperature at the end of the sintering procedure with a cooling rate of 60 degrees centigrade per hour. The entire sintering procedure was conducted under flowing oxygen (10 cubic centimeters per hour).

Due to the shrinkage occuring during the sintering procedure, the resulting article had final surface dimensions of 1.59 centimeters by 1.59 centimeters. The thickness shrinkage was less than 5 percent. A density of greater than 85 percent theoretical value (6.4 grams per cubic centimeter) was achieved, and the proper distribution of flux pinning sites was incorporated into the structure.

The resulting $YBa_2Cu_3O_{7-x}$ sintered article was tested for its purity and bulk superconducting properties. This was accomplished by X-ray diffraction, resistance measurement, and testing for the Meissner effect. A small sintered piece was used as the X-ray diffraction target, and it was observed to be phase pure.

The temperature of the superconducting transition, Tc, was evaluated in accordance with the procedure described in a paper by M. Pistakis and X. W. Wang, "Automated Superconductor Measurements System," The Review of Scientific Instrum., 60(1), pages 135–136, January, 1989. A Keithly current source providing about 1 milliampere to the sample (model number 228A, Keithly Instrument Inc., Cleveland, Ohio) was used. A Keithly multimeter (model 195) was used as a voltmeter to measure the voltage drop across the superconducting sample due to the current. The resistance of the sample at a given temperature is equal to the voltage divided by the current. Another Keithly multimeter (model 196) was used as a voltmeter for the thermocouple. The Tc of the material was 90 degrees Kelvin.

Testing for the Meissner effect was done by cooling the $YBa_2Cu_3O_{7-x}$ article below its superconducting transition temperature with liquid nitrogen and placing a samarium cobalt magnet (obtained from Edmund Scientific Company, 1989 Cat. no. D33,168) on top of the article. The magnet displayed the necessary Meissner levitation effect.

EXAMPLE 2

A linear superconductive motor platform, similar to that depicted as 12 in FIG. 1, was produced from the sintered article described in the example 1. The surface of the sintered article was polished using 600 grit emery paper. Acetone (obtained from Fisher Scientific Corporation, reagent number A18-1, Fisher 88 catalog) was used during the polishing to rise and clean the surface of the article.

Grooves were cut into the surface of the polished article to provide places to lay conductors flush with the surface of the article. A diamond saw (available from Motion Dynamics of New Jersey) was used to cut such grooves. The grooves were 0.079 centimters wide and 0.079 centimeters deep, were separated from each other by a distance of about 0.12 centimeters.

Epoxy resin (Type number 1266, manufactured by the Emerson and Cumming Company of Massachusetts and sold by the Dean Company of Ithaca, N.Y.) was inserted in the grooves. 30 AWG copper wire was then inserted into the grooves; there was approximately 1 centimeter of extra wire on each side of the article to allow for connection to the switching circuit.

EXAMPLE 3

A bidirectional platform, similar to that depicted in FIG. 5, was constructed in substantial accordance with the procedure of Example 2. Perpendicular grooves were cut using the same spacings to obtain the mesh pattern.

EXAMPLE 4

271-023), and a 10 ampere 16 volt adjustable power supply (obtained from BK Precision Company) were used to construct the circuit depicted in FIG. 29. The circuit was housed in a protective cabinet with an output connector (obtained from Newark Electronics, catalog number 81F5183) to make the connection to the conductors on the motors. Each conductor was connected to its own switchable power transistor.

The following software program was written in BASIC to provide positve direct current voltage control signals to each of the conductors.

```
12    REM    VARIABLES:
14    REM      A - CURRENT ACTIVATED CONDUCTOR
16    REM      B - NUMBER OF CONDUCTORS TO BE ACTIVATED
18    REM      CY - NUMBER OF MOTOR RUNNING CYCLES
20    REM      C1 - CURRENT RUN CYCLE
22    REM      C2 - CONDUCTOR TO BE SWITCHED ON
24    REM      TI - INTERNAL CLOCK
26    REM      XA - CURRENT/VOLTAGE CONDUCTOR PULSE DURATION
28    REM      XB - SWITCH OFF DURATION
30    REM      X1 - USER INPUT PULSE DURATION
32    REM      X2 - USER INPUT SWITCH OFF DURATION
34    REM    SUBROUTINES:
36    REM      1000 - CONDUCTOR OUTPUT CONTROL
38    REM    ****************************************************
100   A=0,B=0,CY=0,C2=0,XA=0,XB=0,X1=0,X2=0
110   POKE 37136,255
120   POKE 37138,255
130   INPUT "ENTER NUMBER OF MOTOR CYCLES";CY
140   INPUT "ENTER CONDUCTOR PULSE DURATION IN SEC.";X1
150   INPUT "ENTER SWITCH OFF DURATION IN SEC.";X2
160   X1=X1*60
170   X2=X2*60
180   FOR C1 = 1 TO CY
190      GOSUB 1000
200   NEXT
210   POKE 37136,255
220   END
1000     READ B
1010     FOR A = 1 TO B
1020        READ C2
1030        XA = X1 + TI
1040        POKE 37136,C2
1050        IF TI >= XA THEN POKE 37136,255: GOTO 1070
1060        GOTO 1030
1070        XB = X2 + TI
1080        IF TI >= XB THEN 1100
1090        GOTO 1045
1100     NEXT
1110     RETURN
2000  DATA     32,1,2,3,4,5,6,7,8,9,10,11,12,13,14,15,16
               17,18,19,20,21,22,23,24,25,26,27,28,29,30,
               31,32
```

Two linear and one bidirectional superconductor motors were constructed in substantial accordance with the procedures of Examples 2 and 3, respectively. The motors were then attached to a cooling chamber substantially identical to that chamber depicted in FIG. 30; such attachment was made with epoxy containing silver substances; and the motors were set next to each other, in a substantially linear arrangement, with the bidirectional motor in the center position.

The cooling chamber was filled with liquid nitrogen.

EXAMPLE 5

A Commodore computer (model VIC-20), two multiduplexors (obtained from Jameco Electronics, Belmont, Calif., model number 74154), thirty-two reed relays (obtained from Tandy Corporation of Fort Worth, Tex., catalog number 275232, catalog number 432), thirty-two NPN powder transistors (obtained from Newark Electronics Company, Motorola MJ11032, page 59) two 1000-ohm 0.5 watt resistors (obtained from Tandy Corporation, catalog number The first number of the DATA statement (line 2000) represents the number of activations per motor run cycle, and the following numbers refer to the specific conductor that is to be switched on. Each motor application may require different conductors to be switched on sequentially; this may be accomplished by retyping line 2000 into that preferred arrangement.

By way of illustration, if one were to view the motor assembly of Example 4, the conductors that were set parallel to each other from left to right across the whole motor platform assembly were numbered 1 to 24, and the perpendicular conductors on the middle motor were numbered from 25 to 32 from top to bottom. Thus, to obtain simple linear motion, which could find application in a mass conveyor system, moving from left to right, line 2000 would read: 2000 DATA 24, 1, 2, 3, 4, 5, 6, 7, 8, 9, 10, 11, 12, 13, 14, 15, 16, 17, 18, 19, 20, 21, 22, 23, 24.

EXAMPLE 6

Another application of the motor assembly and control mechanism described in the example 5 can be a separation device. A screen with two holes was placed between one linear motor and another bidirectional motor. The screen was used for separating magnetic materials, which was made of nonmagnetic material. An aluminum bar of 1.59 centimeters length, 1.59 centimeters height, and 0.10 centimeters thickness was used. Two slots were cut into the bar along its bottom width; one was the length between perpendicular conductors 25 and 27, and it was 0.48 centimeters wide; and the other was the length between perpendicular conductors 29 and 32, and it was 0.68 centimeters wide. The height of each of the slots was 1 centimeter. The screen was placed between the bidirectional and the right linear motor, between parallel conductors 16 (bidirectional motor) and 17 (linear motor). Different sized magnetic particles were then separated according to their maximum dimensions across the poled faces of the particles (see FIG. 4).

The magnetic particles were placed at the upper left hand corner of the left linear motor, where it was then stepped onto the bidirectional motor, from left to right. The particle was then oriented so that it was levitated approximately in the area defined by vertical conductor 16 and perpendicular conductor 26. The rest of the parallel conductors (17, 18 . . . ) were activated so that the particle experienced a pulling force from left to right and was collected at the top end of the right linear motor.

One of the particles had a size larger than 0.48 by 0.48 centimters but smaller than 0.68 by 0.68 centimeters. This particle did not pass through the hole in the screen which was 0.48 by 1.0 centimeter large. This particle was then stepped along the perpendicular conductors (26, 27, 28, 29, 30, 31) to the area defined by vertical conductor 16 and perpendicular conductor 31. The conductors 17, 18, 19, 20, 21, 22, 23, and 24 were then activated, and the particle was pulled through the second hole defined by 0.68 centimeters by 1.0 centimeter.

The 2000 line of the program was changed.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

In one embodiment, sensors are electrically, optically, magentically, or operatively connected to various portions of the stepper motor to determine the presence or absence of particles therein or thereon. Suitable sensors include, e.g., magnetic pickup coils, semiconductor sensors, and the like.

We claim:

1. A contactless, multi-dimensional small stepper motor with a maximum dimension of less than about 10 centimeters for converting electrical energy to mechanical energy which causes movement of at least one transportable, magnetized article, wherein said motor comprises at least one superconductive primary suspending element, at least two primary conductive elements, at least one transportable magnetized element, means for supplying electrical energy to at least one of said primary conductive elements, means for cooling said superconductive primary suspending element, means for causing the movement of said article, and means for stopping the movement of said article, wherein:
   (a) said superconductive primary suspending element is comprised of at least 50 volume percent of superconductive material, wherein said superconduntive material:
      1. has a first critical field value greater than about 10 Gauss, a second critical field value of at least one Tesla, and a critical temperature greater than 35 degrees Kelvin; and
      2. said superconductive material has a flux penetration ratio of from about 0.01 to about 0.1;
   (b) each of said primary conductive elements is separated from each adjacent primary conductive element by a distance of from about 0.01 to about 10 millimeters; and
   (c) the largest dimension of said transportable, magnetized article is no greater than 1 centimeter; and
   (d) said magnetized article has a magnetic moment between said first critical field value and said second critical field value.

2. The stepper motor as recited in claim 1, wherein said superconductive material has a critical temperature of at least about 77 degrees Kelvin.

3. The stepper motor as recited in claim 2, wherein said superconductive material is a Type II superconductor.

4. The stepper motor as recited in claim 3, wherein said primary conductive elements consist esentially of material selected from the group consisting of copper aluminum, silver, gold, and superconductor material.

5. The stepper motor as recited in claim 4, wherein said conductive elements consist essentially of a material selected from the group consisting of copper and silver.

6. The stepper motor as recited in claim 4, wherein said conductive elements consist essentially of magnet wire.

7. The stepper motor as recited in claim 6, wherein said magnet wire has a gauge of from about 20 to about 40.

8. The stepper motor as recited in claim 5, wherein said conductive elements consist of wires with a gauge of from about 20 to about 40.

9. The stepper motor as recited in claim 8, wherein said conductive elements are electrically insulated from said superconductive primary suspending element.

10. The stepper motor as recited in claim 9, wherein said conductive elements have a maximum cross-sectional dimension of no greater than about 5 millimeters.

11. The stepper motor as recited in claim 10, wherein said conductive elements have a maximum cross-sectional dimension of no greater than about 3 millimeters.

12. The stepper motor as recited in claim 11, wherein said conductive elements have a maximum cross-sectional dimension of no greater than about 1 millimeter.

13. The stepper motor as recited in claim 1, wherein the levitation height of said superconductive material is at least about 0.1 centimeters.

14. The stepper motor as recited in claim 1, wherein the levitation height of said superconductive material is at least about 0.7 centimeters.

15. The stepper motor as recited in claim 1, wherein said means for cooling said superconductive primary suspending element is a chamber partially filled with cryogenic coolant.

16. The stepper motor as recited in claim 15, wherein said cryogenic coolant is liquid nitrogen.

17. The stepper motor as described in claim 1, wherein each of said superconductive primary suspending elements are electrically insulated from each of the other of said superconductive primary suspending elements.

18. The stepper motor as described in claim 17, wherein at least two of said primary conductive elements are connected to at least one of said superconductive primary suspending elements.

19. The stepper motor as described as described in claim 17, wherein said superconductive primary suspending elements are so configured and attached to each other that they define a three-dimensional grid.

20. The stepper motor as described in claim 1, wherein said primary conductive elements are physically attached to an element selected from group consisting of at least one of said primary suspending elements, at least one of said means for cooling said supercondutive primary suspending elements, and mixtures thereof.

* * * * *